United States Patent
Kaida

(10) Patent No.: US 9,164,721 B2
(45) Date of Patent: Oct. 20, 2015

(54) INFORMATION DISPLAY DEVICE AND INFORMATION DISPLAY METHOD

(71) Applicant: Yukiko Kaida, Tokyo (JP)

(72) Inventor: Yukiko Kaida, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 281 days.

(21) Appl. No.: 13/899,649

(22) Filed: May 22, 2013

(65) Prior Publication Data
US 2013/0314299 A1 Nov. 28, 2013

(30) Foreign Application Priority Data
May 28, 2012 (JP) .................... 2012-120643

(51) Int. Cl.
G06F 3/14 (2006.01)
G09G 3/00 (2006.01)

(52) U.S. Cl.
CPC .............. *G06F 3/1423* (2013.01); *G09G 3/002* (2013.01); *G09G 2320/08* (2013.01); *G09G 2356/00* (2013.01); *G09G 2370/022* (2013.01)

(58) Field of Classification Search
CPC ......................... G06F 3/01; H04N 2201/3252
See application file for complete search history.

(56) References Cited

U.S. PATENT DOCUMENTS

| 8,213,858 B2 * | 7/2012 | Wei et al. ...................... 455/3.05 |
| 8,774,827 B2 * | 7/2014 | Scalisi et al. ................ 455/456.1 |
| 2011/0292080 A1 | 12/2011 | Oka |

FOREIGN PATENT DOCUMENTS

| JP | 2007-212628 | 8/2007 |
| JP | 2007-299148 | 11/2007 |
| JP | 2010-181509 | 8/2010 |
| JP | 2010-243845 | 10/2010 |
| JP | 2011-049865 | 3/2011 |
| JP | 2011-248078 | 12/2011 |

* cited by examiner

*Primary Examiner* — Antonio A Caschera
(74) *Attorney, Agent, or Firm* — IPUSA, PLLC

(57) ABSTRACT

An information display device includes a location obtaining part configured to obtain location information, a communication part configured to communicate with at least one other information display device through a network, a setting management part configured to determine setting information corresponding to the location information based on setting management information stored in a memory part of the at least one other information display device in response to an operation from a user, a display part configured to display information; and a control part configured to control an output of the information displayed on the display part by using the setting information.

20 Claims, 23 Drawing Sheets

FIG.5

| SETTING MANAGEMENT INFORMATION | | ←140 |
|---|---|---|
| LOCATION INFORMATION | SETTING INFORMATION | |
| A MEETING ROOM | LEVEL 5 | |
| B MEETING ROOM | LEVEL 3 | |

141 — LOCATION INFORMATION
142 — SETTING INFORMATION

FIG.6

| LOCATION INFORMATION CONVERSION TABLE | | ←120 |
|---|---|---|
| COORDINATE INFORMATION | LOCATION INFORMATION | |
| (0,0)(100,100) | A MEETING ROOM | |
| (0,100)(100,200) | B MEETING ROOM | |

121 — COORDINATE INFORMATION
122 — LOCATION INFORMATION

FIG.14

| CONTROL PARAMETER CONVERSION INFORMATION (PROJECTOR 10) | |
|---|---|
| SETTING INFORMATION | CONTROL PARAMETER |
| LEVEL 1 | 20 LUX |
| LEVEL 2 | 50 LUX |
| LEVEL 3 | 100 LUX |
| LEVEL 4 | 500 LUX |
| LEVEL 5 | 750 LUX |

FIG.21

| TIME ZONE DEFINITION INFORMATION | |
|---|---|
| TIME INFORMATION | TIME ZONE INFORMATION |
| 18:00-24:00<br>0:00-7:00 | EVENING |
| 7:00-12:00 | MORNING |
| 12:00-18:00 | AFTERNOON |

FIG.22

| SETTING MANAGEMENT INFORMATION | | |
|---|---|---|
| LOCATION INFORMATION | TIME ZONE INFORMATION | SETTING INFORMATION |
| A MEETING ROOM | MORNING | LEVEL 5 |
| A MEETING ROOM | AFTERNOON | LEVEL 4 |
| A MEETING ROOM | EVENING | LEVEL 3 |
| B MEETING ROOM | AFTERNOON | LEVEL 3 |

FIG.25

| SETTING MANAGEMENT INFORMATION | | |
|---|---|---|
| LOCATION INFORMATION | BRIGHTNESS INFORMATION | SETTING INFORMATION |
| A MEETING ROOM | 2000 LUX | LEVEL 5 |
| A MEETING ROOM | 500 LUX | LEVEL 3 |
| B MEETING ROOM | 1000 LUX | LEVEL 3 |

INFORMATION DISPLAY DEVICE AND INFORMATION DISPLAY METHOD

BACKGROUND OF THE INVENTION

1. Field of the Invention

The present invention relates to an information display device and an information display method.

2. Description of the Related Art

In recent years, a meeting is frequently conducted by projecting contents stored in a PC (i.e., a personal computer) and the like on a projector. The projector is portable, and setting information of the projector such as brightness, color depth, a color shade and the like has to be set in accordance with an environment of a meeting room used in the meeting. In response to this, a technology is already known that automatically controls the setting information at a proper setting suitable for a location of the projector when using the projector.

For example, Japanese Laid-Open Patent Application Publication No. 2010-243845 (which is hereinafter called "Patent Document 1") discloses a technology that automatically controls setting information at a setting suitable for a location of a projector when using the projector by preliminarily storing location information of the projector and setting information at the location, and by reading the setting information corresponding to the location of the projector when using the projector. In Patent Document 1, the utilized location information is arrangement information of the projector, and the setting such as compensation of a projected image is performed based on the location or an inclination of the projector.

Japanese Laid-Open Patent Application Publication No. 2007-299148 (which is hereinafter called "Patent Document 2") discloses a technology that creates print setting information based on general information (e.g., schedule information) stored in a server in a MFP (i.e., Multifunction Peripheral).

However, Patent Documents 1 and 2 do not assume that the projector uses the setting information of another projector when automatically controlling the setting information of its own projector.

On the other hand, in automatically controlling the setting information of its own, if utilizing the setting information of another projector, the projector can set the setting information of its own to be suitable for the usage environment more quickly.

SUMMARY OF THE INVENTION

Accordingly, embodiments of the present invention may provide a novel and useful information display device and an information method solving or reducing one or more of the above-described problems.

More specifically, the embodiments of the present invention may provide an information display device and an information display method that can set setting information at a location corresponding to its own location by utilizing setting information of another information display device.

According to one embodiment of the present invention, there is provided an information display device that includes a location obtaining part configured to obtain location information, a communication part configured to communicate with at least one other information display device through a network, a setting management part configured to determine setting information corresponding to the location information based on setting management information stored in a memory part of the at least one other information display device in response to an operation from a user, a display part configured to display information, and a control part configured to control an output of the information displayed on the display part by using the setting information.

According to another embodiment of the present invention, there is provided an information display device that includes a location information obtaining part configured to obtain location information, a communication part configured to communicate with an external memory device through a network, a setting management part configured to determine setting information corresponding to the location information based on setting management information of at least one other information display device stored in the external memory device in response to an operation from a user, a display part configured to display information, and a control part configured to control an output of the information displayed on the display part by using the setting information.

According to another embodiment of the present invention, there is provided an information display method. In the method, a first information display device obtains location information of a first information display device in response to an operation of the first information display device by a user, and requests at least one second information display device to provide setting information corresponding to the location information for the first display device through a network. The at least one second information display device determines the setting information corresponding to the location information based on setting management information stored in a memory part of the at least one second information display device. Then, the first information display device obtains the setting information from the at least one second display device, and displays information on a display part of the first display device by controlling an output of the information, using the setting information.

Other objects, features and advantages of the present invention will become more apparent from the following detailed description when read in conjunction with the accompanying drawings.

BRIEF DESCRIPTION OF THE DRAWINGS

FIG. 5 is a diagram showing a data example of management information of the first through fourth embodiments;

FIG. 6 is a diagram showing an example of a location information conversion table of the first through sixth embodiments;

FIG. 14 is a diagram showing an example of control parameter conversion information of the fourth embodiment;

FIG. 21 is a diagram showing an example of time zone definition information of the fifth embodiment;

FIG. 22 is a diagram showing an example of setting management information of the fifth embodiment;

FIG. 25 is a diagram showing an example of setting management information of the sixth embodiment.

DETAILED DESCRIPTION OF THE PREFERRED EMBODIMENTS

Figure 1:
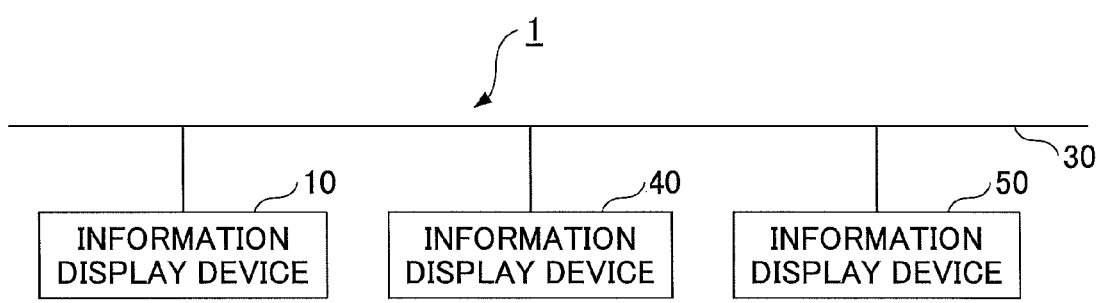
FIG. 1 is a system configuration diagram of first through sixth embodiments of the present invention.

A description is given, with reference to the accompanying drawings, of respective embodiments of the present invention. In the present specification and drawings, with respect to components having the substantially same function and configuration to each other, an overlapping description is omitted by attaching the same numerals to the substantially same components.

[Whole Configuration of System]

A description is given below about an information display system of first through sixth embodiments, with reference to FIG. 1. In the information display system 1 of the first through sixth embodiments, an information display device 10, an information display device 40 and an information display device 50 are connected through a network 30. The information display devices 10, 40 and 50 may be the same devices or different devices as long as each of the information display devices 10, 40 and 50 has a communication function and a display function. In the following embodiments, a projector is cited as an example of each of the information display devices, and a description is given by replacing the information display device 10, the information display device 40 and the information display device 50 with a projector 10, a projector 40 and a projector 50 respectively. However, the information display devices are not limited to the projectors, and can be other portable electronic devices such as tablet devices and the like. Moreover, in the present embodiments, a description is given by citing an amount of light (i.e., brightness) as setting information of a self-projector as an example, but performing the automatic control using color depth, a color shade or the like as the setting information is possible.

In the present embodiments, any projector obtains desired setting information from setting management information stored in a memory area in another projector on the network 30. An analog line, an ADSL (Asymmetric Digital Subscriber Line) line, a digital line (e.g., ISDN (Integrated Services Digital Network) line), a landline utilizing an optical fiber, a cellar phone network, a mobile phone network such as PHS (Personal Handyphone System) network, or the internet can be used as the network 30.

Figure 2:
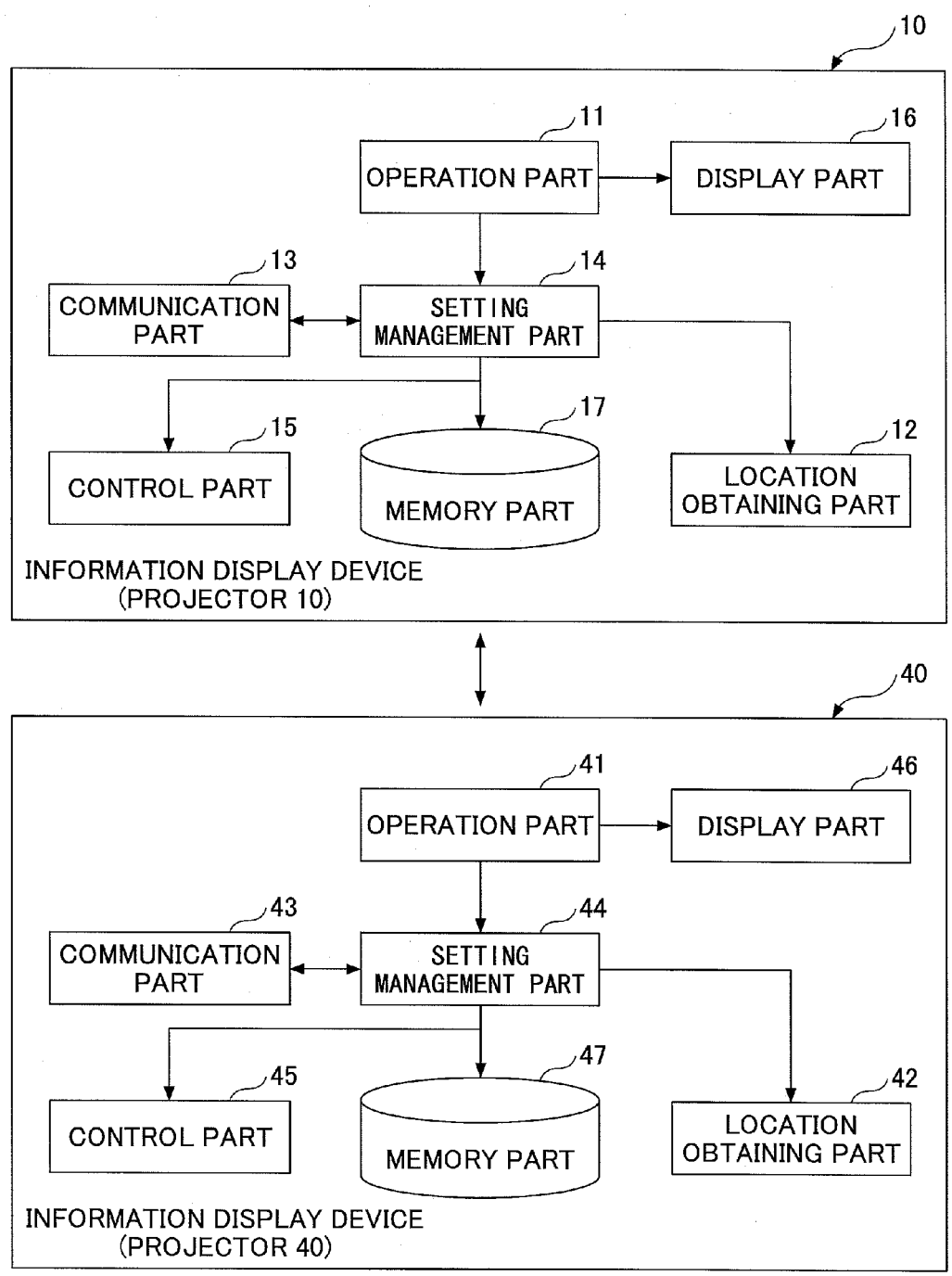
FIG. 2 is an inner configuration diagram of projectors of first through fourth embodiments.

In the present embodiments, the projectors 10, 40 and 50 have the same configuration. Accordingly, in FIG. 2, internal configurations of the projectors 10 and 40 are shown, but an internal configuration of the projector 50 is omitted. Hereinafter, for the convenience of explanation, a description is given by assuming that the projector 10 functions as the self-projector that automatically controls the setting information, and that the projector 40 functions as another projector. However, any of the projectors 10, 40 and 50 can function as the self-projector, and any of the projectors 10, 40 and 50 can function as another projector.

The projector 10 includes an operation part 11, a location obtaining part 12, a communication part 13, a setting management part 14, a control part 15, a display part 16, and a memory part 17.

The operation part 11 is constituted of, for example, a remote control, and allows a user to operate the projector 10 by accepting an operation from the user.

The location obtaining part 12 obtains location information indicating a location where the projector 10 is arranged. The location obtaining part 12 obtains a coordinate indicating the location of the projector 10, for example, by using a GPS (Global Positioning System).

The communication part 13 is, for example, constituted of a communication circuit and an antenna, and communicates with another projector through the network 30.

The setting management part 14, whose function is, for example, executed by a CPU (Central Processing Unit) that is not shown in the drawing, obtains the setting information corresponding to the location information from setting management information stored in a memory part of another projector depending on the user operation using the operation part 11, and treats the setting information as the setting information of the self-projector.

The control part 15, whose function is, for example, executed by a CPU (Central Processing Unit) that is not shown in the drawing, controls the whole projector 10. The control part 15 controls an output (i.e., an amount of light) of information displayed on the display part 16, for example, by using the setting information.

The display part 16 is, for example, constituted of a display, and displays the information at the controlled amount of light.

The memory part 17 is, for example, constituted of a RAM (Random Access Memory) or a ROM (Read Only Memory) that is not shown in the drawing, and stores a program or various data to implement respective functions of the projector 10.

An example of the setting management information stored in the memory part 17 is shown in FIG. 5. Setting management information 140 is managed by the setting management part 14. The setting management information 140 is automatically stored when the projector 10 is turned off. The memory part 17 stores the setting information at the time when the self-projector was previously used, in the setting management information 140. Hence, the setting information 142 is a value that the user set the last time or before the last time. Moreover, the location information 141 is a location where the projector 10 was used, and is obtained by the location obtaining part 12.

In FIG. 5, an A meeting room and a B meeting room is set as the location information 141, and a level 5 and a level 3 are set as the setting information 142 corresponding to the respective A and B meeting rooms. Here, the amount of light in which the projector 10 was previously used in the A meeting room and the amount of light in which the projector 10 was used in the B meeting room were shown by a difference in level. In the present embodiments, the control is performed to display the information more brightly as the level of the setting information 142 is higher.

The location information is obtained by converting the coordinate information transmitted from the GPS and the like. For example, as FIG. 6 shows an example of a location information conversion table 120, the location information conversion table 120 stores coordinate information 121 and location information 122 corresponding therewith each other. The location obtaining part 120 converts the coordinate information transmitted from the GPS and the like to a meeting room name as the location information, and stores the meeting room name in the location information conversion table 120. The location information conversion table 120 is stored in the memory part 17 in the projector 10 or in a memory device on the network 30.

The projector 40 includes an operation part 41, a location obtaining part 42, a communication part 43, a setting management part 44, a control part 45, and a memory part 47. Because functions of respective parts of the projector 40 are the same as the functions of the respective parts of the projector 10, the description is omitted here.

[Modification of Whole System Configuration]

Figure 3:
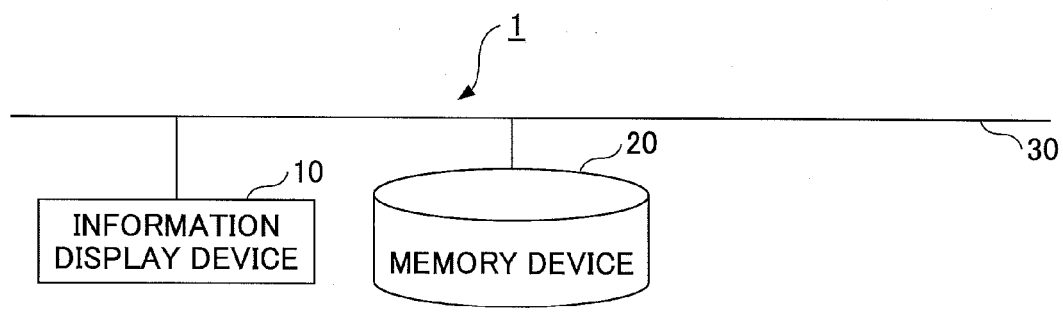
FIG. 3 is a system configuration diagram of a modification.

A configuration shown in FIG. 3 may be adopted as a modification of the information display system 1. The information display system 1 of the modification is configured to include an information display device 10 having a communication function that is connected to an external memory device 20 through a network 30, and obtains the setting management information from the external memory device 20. The external memory device 20 may be a memory area on a specific server that manages the information display device 10, or may utilize a memory area on cloud computing.

Figure 4:
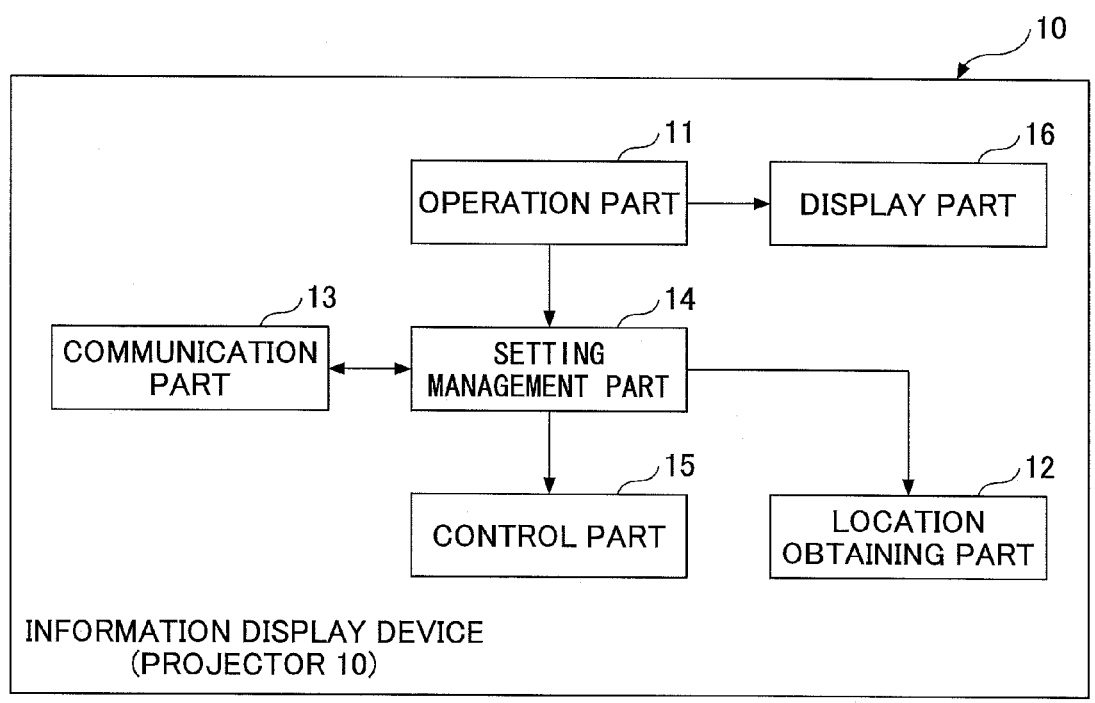
FIG. 4 is a diagram showing an example of setting management information of the first through fourth embodiments.

The information display device (i.e., projector 10) of the modification, as shown in FIG. 4, includes an operation part 11, a location obtaining part 12, a communication part 13, a setting management part 14, a control part 15, and a display part 16. The information display device 10 of the present modification differs from the information display device 10 in FIG. 2 that internally includes the memory part 17, in the lack of the memory part 17 inside.

The information display system 1 of the modification communicates with the external memory device 20 through the network 30. The setting management part 14 obtains setting information corresponding to the location information obtained by the location obtaining part 12 from the setting management information of other projectors 40 and 50 stored in the external memory device 20, according to the user operation, and defines the setting information as the setting information of the self-projector 10.

The control part 15 controls an output (i.e., an amount of light) of information displayed on the display part 16 by using the determined setting information. For example, the control part 15 controls the amount of light in displaying the information on the display part 16 by using the determined setting information. The display part 16 displays the information at the controlled amount of light.

[Sequence of Storing Setting Management Information]

Figure 7:
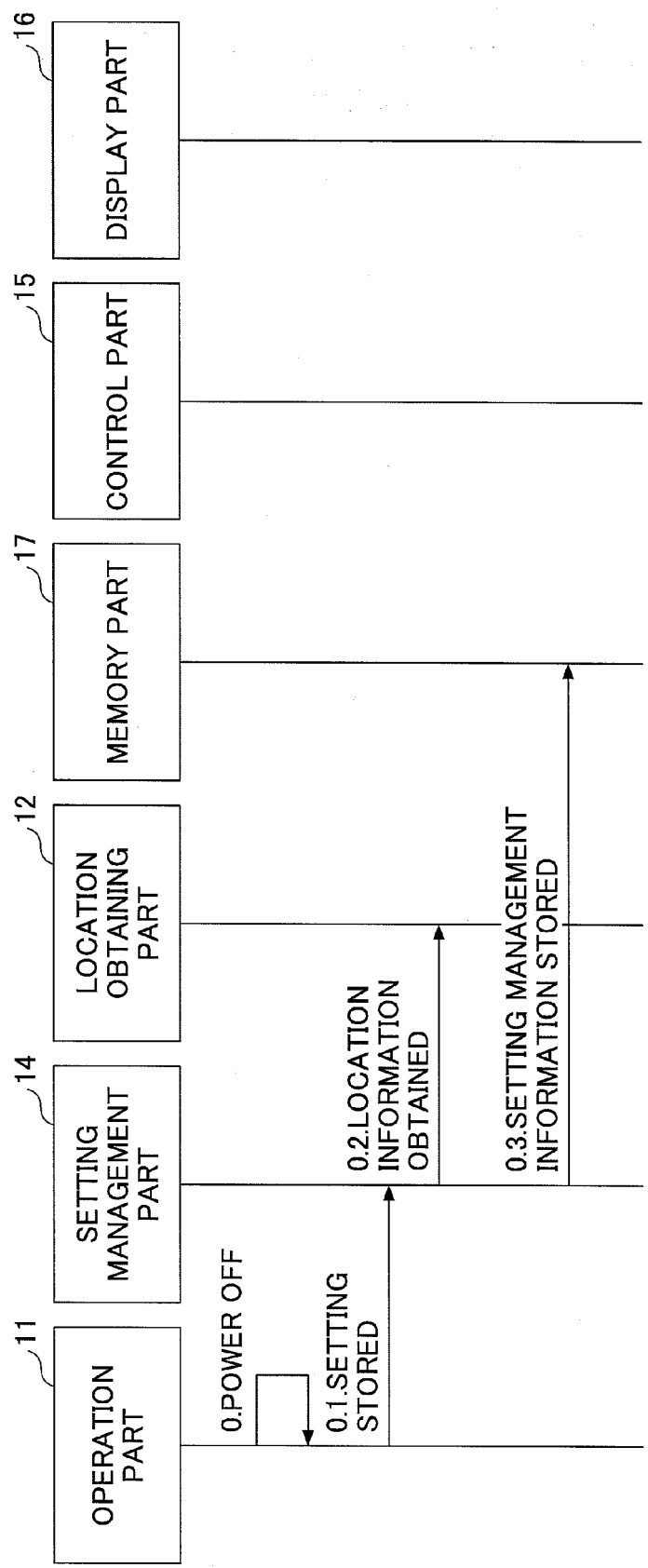
FIG. 7 is a sequence diagram of storing the setting management information of the first through third embodiments of the present invention.

Next, a description is given about a process of storing setting management information, with reference to a sequence of storing the setting management information in FIG. 7. The process of storing the setting management information is conducted according to the following procedure when a projector is turned off. Here, the process of storing the setting management information can be executed in all of the projectors 10, 40 and 50. As a result of the execution, new setting information is corresponded to the location information and is stored in the setting management information stored in the memory part in each of the projectors. A description is given below about operation of the projector 10, and a description about operation of the projectors 40 and 50 that operate similarly to the projector 10 is omitted.

0. The projector 10 is turned off by user operation.
0.1. The operation part 11 requests the setting management part 14 to store setting contents in response to the power-off.
0.2. The setting management part 14 obtains location information of the projector 10 from the location obtaining part 12.
0.3. The setting management part 14 associates the obtained location information with the setting information of the projector 10 of this time, and stores the information associated with each other. For example, if the setting level is set at the level 5 and the projector 10 is used in the A meeting room this time, as shown in FIG. 5, the setting management information 140 including the location information 141 of the A meeting room and the setting information of the level 5 is stored in the memory part 17.

[Sequence of Determining Setting Information]

Figure 8:
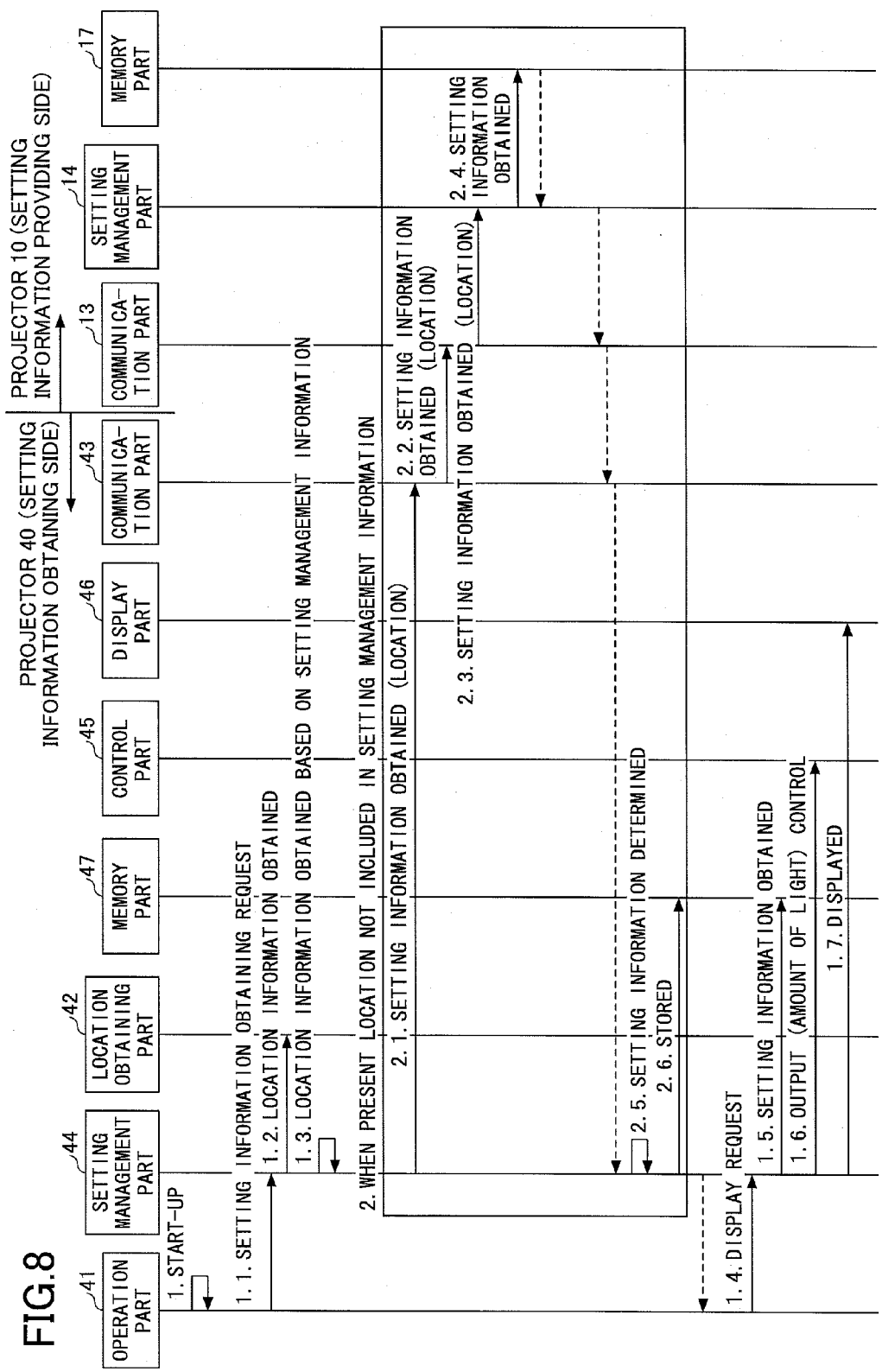
FIG. 8 is a sequence diagram of determining the setting information of the first through third embodiments.

Next, a description is given about a process of determining the setting information, with reference to a sequence of determining the setting information in FIG. 8. The process of determining the setting information is executed when the projector is turned on. The process of determining the setting information can be executed in all of the projectors 10, 40 and 50. Here, when the projector (setting information obtainer side) is made the self-projector, and the projector 10 (setting information provider side) is made another projector, a description is given about operation of the projector 40. Because operation in which the projector 10 or 50 is made the self-projector is similar to the above case, the description is omitted here.

1. The projector 40 is turned on by user operation, and the projector 40 starts up.
1.1. The operation part 41 requests the setting management part 44 to obtain the setting information in response to the power-on.
1.2. The setting management part 44 obtains location information of the projector 40 from the location obtaining part 42.
1.3. The setting management part 44 determines whether the obtained location information of the present projector 40 is included in the location information in the memory part 47 of the self-projector, and obtains the setting information if included. In this case, a process of 1.4. may be executed without performing processes from 2.1. to 2.6. described below, or the processes from 2.1. to 2.6. may be further conducted. When the setting information corresponding to the obtained location information is not included in the location information in the memory part 47, the processes from 2.1. to 2.6. have to be performed.

2. When the setting information corresponding to the obtained location information is not included in the memory part 47, the setting information corresponding to the location information of the present projector 40 is obtained from another projector 10.

2.1. First, the setting management part 44 requests another projector 10 to obtain setting information corresponding to the present location information. Another projector is not limited to the projector 10, but a description is given by citing the projector 10 as an example here.
2.2. The communication part 43 transmits the request to the communication part 13 of the other projector 10, and the communication part 13 receives the request.

2.3. The communication part 13 conveys this request to the setting management part 14 of the other projector 10.

2.4 The setting management part 14 obtains the setting information corresponding to the present location information of the projector 40 that is transmitted from the memory part 17. The communication part 13 transmits the obtained setting information to the projector 40 through the communication part 43. Here, when the present location information of the projector 40 is not included in the location information stored in the memory part 17, the communication part 13 notifies the projector 40 that the present location information of the projector 40 is not included in the location information stored in the memory part 17.

2.5. The setting management part 44 of the projector 40 determines that the setting information sent from the projector 10 is the setting information corresponding to the present location information of the projector 40.

2.6. The setting management part 44 stores the determined setting information in the memory part 47, associating the determined setting information with the location information. Here, in the modifications shown in FIGS. 3 and 4, the communication part 43 transmits the determined setting information to the external memory device 20, and stores the determined setting information in the external memory device 20, associating the determined setting information with the location information.

1.4. When the setting management part 44 determines the setting information, then the operation part 41 requests the setting management part 44 to display the setting information.

1.5. The setting management part 44 obtains the setting information corresponding to the location of the present projector 40 from the memory part 47.

1.6. The control part 45 controls an output (i.e., amount of light) of the information displayed on the display part 46 based on the obtained setting information.

1.7. The display part 46 displays desired information in accordance with output control of the control part 45 on the display.

As discussed above, the processes from 2.1. to 2.6. can be performed for another projector 50. In this case, the setting management part 44 can obtain the setting information corresponding to the obtained location information from the memory part of the projector 50. Accordingly, the number of the setting information that the setting management part 44 can obtain can be a plurality of pieces.

Moreover, when there is another projector other than the other projectors 10 and 50, the projector 40 may communicate with the communicable projector not shown in the drawing, and may obtain the setting information in a similar way. Furthermore, even when the setting information corresponding to the obtained location information is stored in the memory part 47, the projector 40 may further obtain the setting information from the projector.

Next, a description is given about specific examples of methods of determining the setting information, including a method of determining the setting information when having obtained a plurality of pieces of the setting information, by illustrating first through sixth separate embodiments. The methods of determining the setting information described in the first through sixth embodiments can be used in a single or in combination.

Method of Determining Setting Information

First Embodiment

Figure 9:
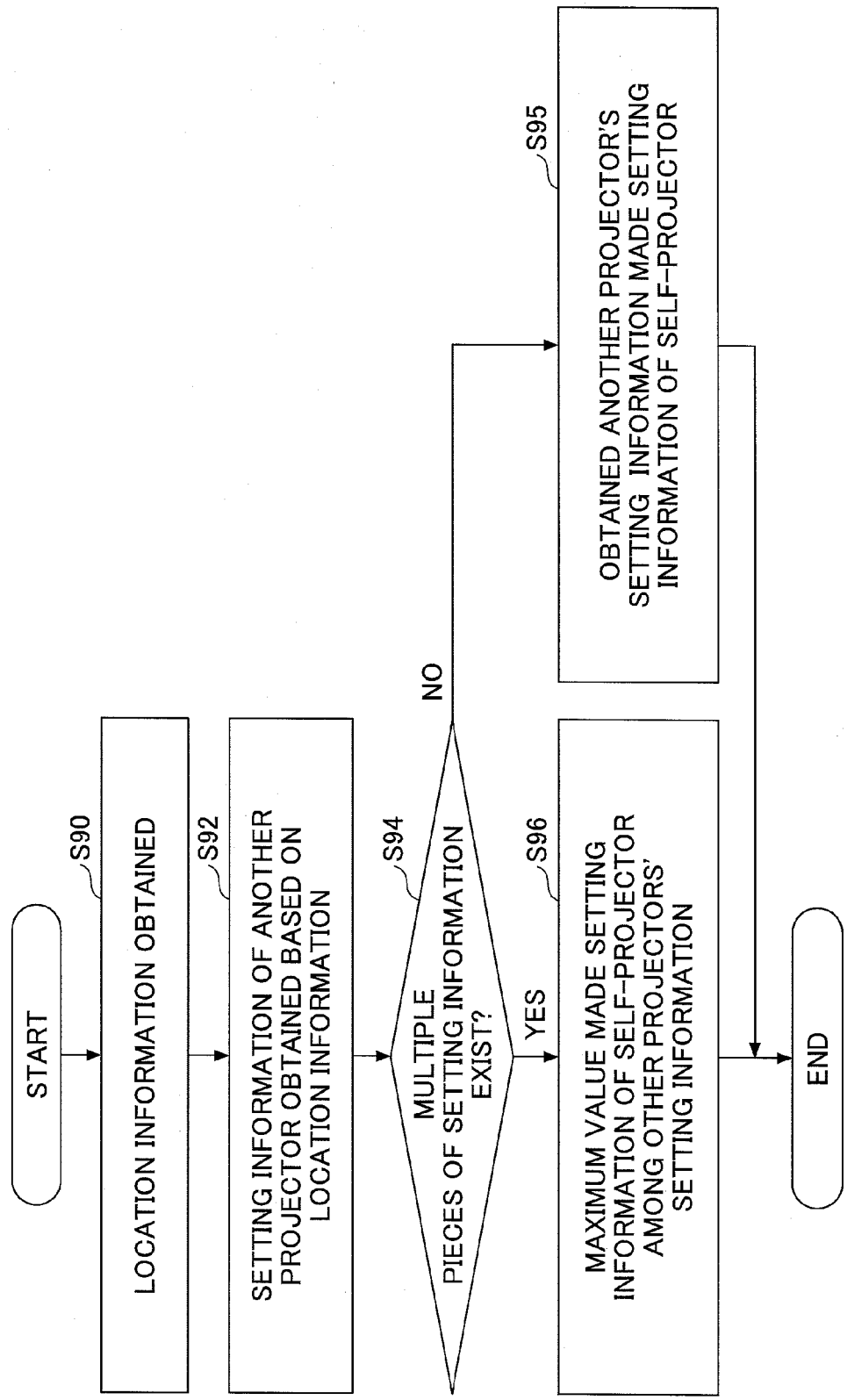
FIG. 9 is a flowchart showing a setting management information determining process of the first and second embodiments.

Next, a description is given about specific methods of determining the setting information of first through sixth embodiments in this order. First, a description is given about a method of determining the setting information of the first embodiment, based on a flowchart of a process of determining the setting information shown in FIG. 9. In the first embodiment, the projector 40 determines the setting information corresponding to the self-location (i.e., A meeting room here) by using the setting management information stored in the memory part 17 of the other projector 10.

Figure 10:
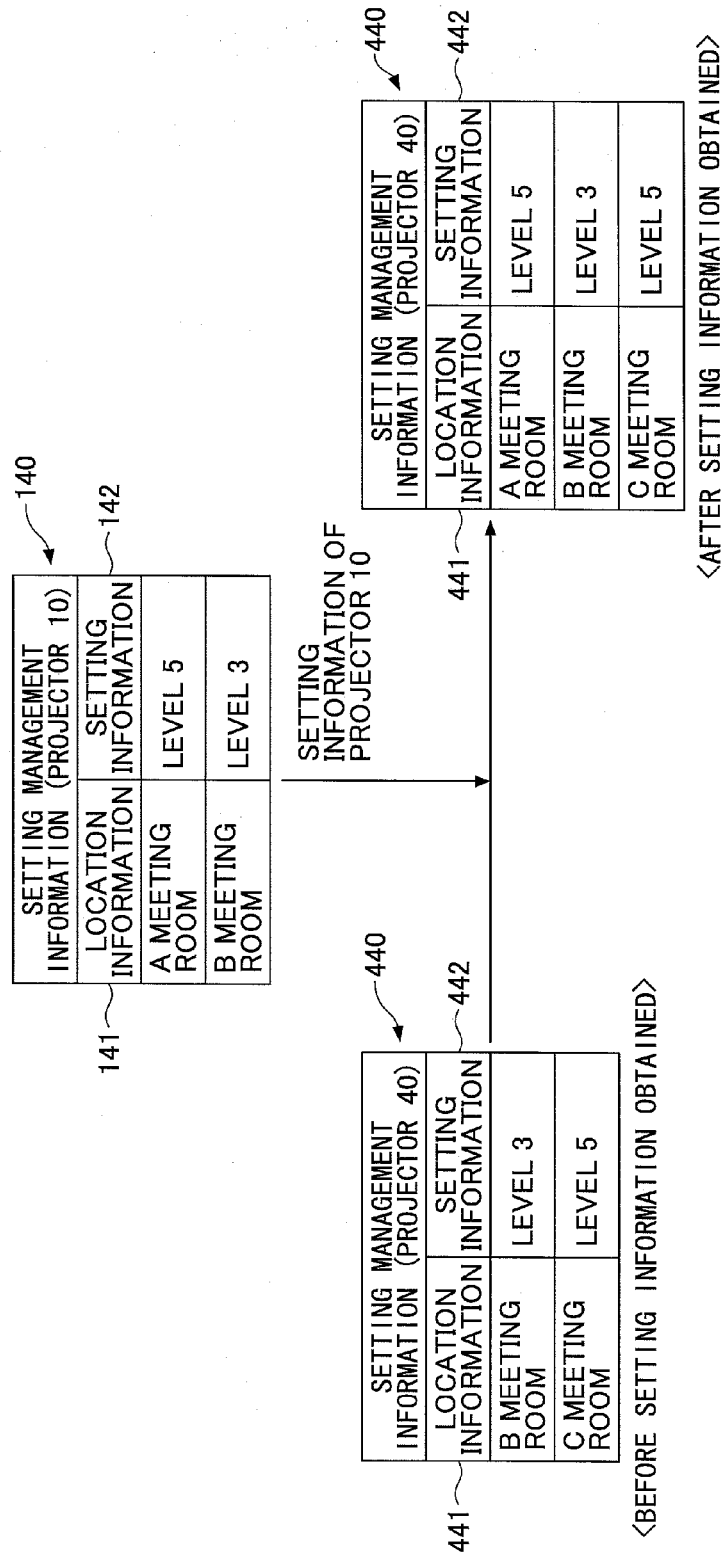
FIG. 10 is a diagram to illustrate setting information determination of the first embodiment.

The present embodiment assumes that the memory part 17 of the projector 10 preliminarily stores setting management information 140 shown in FIG. 10, and that the memory part 47 of the projector 40 preliminarily stores setting management information 440 shown on the left side of FIG. 10.

When a user enters the A meeting room and turns on the projector 40, first, in step S90, the setting management part 44 obtains location information from the location obtaining part 42. At this time, the setting management part 44 determines whether the obtained location information is stored in the setting management information 440 of the memory part 47 of its own. When the obtained location information is stored in the memory 47 of its own, the setting management part 44 determines that setting information corresponding to the location information is the setting information of the projector 40, and finishes the process or advances to step S92.

When the obtained location information (i.e., A meeting room) is not stored in the memory part 47 of the projector 40, (or when having advanced to step S92 even if stored), the processes in a box of 2 shown in FIG. 8 are performed. As a result, the projector 40 obtains determined setting information from the other projector 10 based on the process of determining the setting information performed by the other projector 10 in the box 2.

Here, as shown in FIG. 10, there is setting information 142 when location information 141 is an A meeting room in the setting management information 140. Hence, the setting management part 14 determines that the setting information is "level 5", and the communication part 13 transmits the setting information of "level 5" to the projector 40.

In step S94, it is determined whether the projector 40 has obtained a plurality of pieces of setting information. Here, because the projector 40 has not obtained the plurality of pieces of information, the process advances to step S95. In step S95, the obtained setting information of "level 5" of the other projector 10 is defined as the setting information of the self-projector 40, and the present process is finished.

As described above, according to the method of determining the setting information of the first embodiment, the projector 40 used in the A meeting room projects desired information at the brightness of "level 5" by utilizing the setting information stored in the other projector 10 as shown in FIG. 10. In addition, the setting information of this time is stored in the memory part 47, associated with the A meeting room of the location information. As a result, the setting information corresponding to the A meeting room is stored in the setting management information 440 of the memory part 47, in addition to the setting information corresponding to the B meeting room and the C meeting room. In this manner, the setting management information 440 of the projector 40 can be also utilized as the setting information in using the projectors 10 and 50.

In particular, in a place where a projector is used for the first time, even if the setting information (i.e., history information) of the self-projector connected to the location information cannot be automatically set due to the lack of the setting information of the self-projector, the setting information appropriate for the location of the self-projector can be promptly and automatically set by utilizing the setting information of another projector.

Moreover, the information display system shown in FIG. 1 has advantages that the memory device 20 is not required to be prepared, and that the projectors can utilize the setting information of each other by obtaining the setting information of the other projector and by incorporating the setting information of the other projector as the setting information of its own, compared to the information display system of the modification shown in FIG. 3.

Second Embodiment

Next, a description is given about a method of determining the setting information of a second embodiment with reference to FIG. 9 again. In the second embodiment, the projector 50 determines the setting information corresponding to the location information of its own (i.e., A meeting room here) by using the setting information stored in the memory parts 17 and 47 of the plurality of other projectors 10 and 40.

Figure 11:
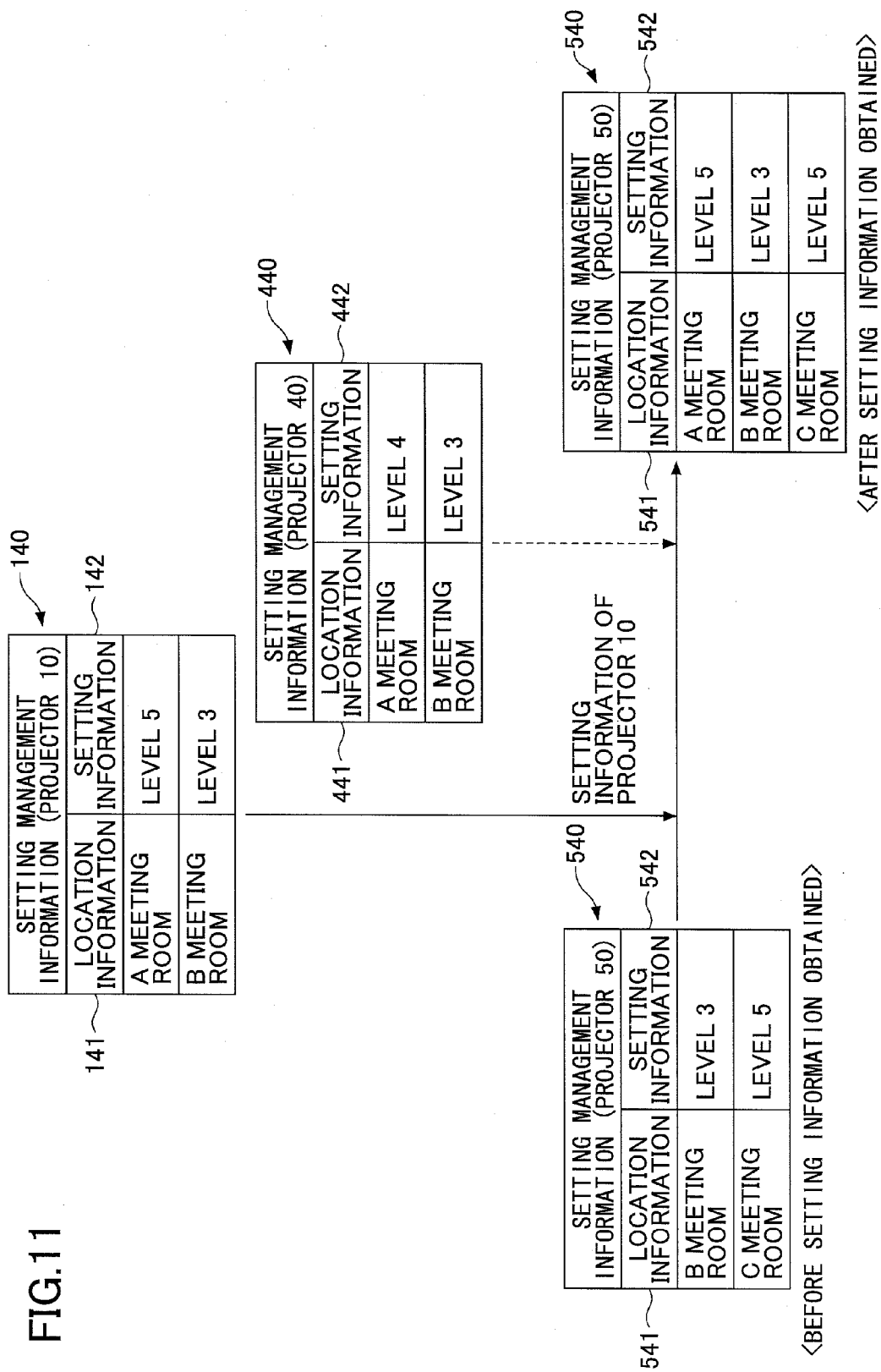
FIG. 11 is a diagram to illustrate setting information determination of the second embodiment.

The present embodiment assumes that the memory part 17 of the projector 10 preliminarily stores setting management information 140 shown in FIG. 11, and the memory part 47 of the projector 40 preliminarily stores setting management information 440 shown in FIG. 11. Furthermore, the memory part of the projector 50 is assumed to preliminarily store setting management information 540 shown on the left side of FIG. 11.

When a user enters the A meeting room and turns on the projector 50, first, in step S90, a setting management part of the projector 50 obtains location information from a location obtaining part of the projector 50. At this time, the setting management part of the projector 50 determines whether the obtained location information is stored in the setting management information 540 of own memory part. When the obtained location information is stored in the memory part of its own, the setting management part determines that setting information corresponding to the location information is the setting information of the projector 50, and finishes the present process flow, or advances to step S92.

When the obtained location information (i.e., A meeting room) is not stored in the memory part of the projector 50 (or when proceeding to step S92 even if stored), the processes in the box 2. shown in FIG. 8 are executed. As a result, the projector 50 obtains the determined setting information from the other projectors 10 and 40 based on the process of determining the setting information performed by the other projectors.

Here, as shown in FIG. 11, the setting management information 140 contains setting information 142 when location information 141 is the A meeting room. Accordingly, the setting management part 14 determines that the setting information is "level 5," and the communication part 13 sends the setting information of "level 5" to the projector 40.

Moreover, as shown in FIG. 11, the setting management information 440 contains setting information 442 when location information 441 is the A meeting room. Hence, the setting management part 44 determines that the setting information is "level 4," and the communication part 43 sends the setting information of "level 4" to the projector 50.

In step S94, it is determined whether the projector 40 has obtained a plurality of pieces of setting information. In the present embodiment, since the projector 50 has obtained the plurality of pieces of setting information, the process advances to step S96. In step S96, the projector 50 determines that a maximum value of "level 5" is the setting information of its own of the plurality of pieces of setting information of the other projectors 10 and 40, and finishes the present process flow.

As described above, according to the method of determining the setting information of the second embodiment, the projector 50 used in the A meeting room projects desired information at the brightness of "level 5" by utilizing the maximum value of the plurality of pieces of setting information stored in the other projectors 10 and 40. Thus, by adopting the brighter value as the setting value of the projector, the information can be displayed in a state visually easy to see.

Furthermore, the setting information of this time is stored in the memory part of the projector 50 as the setting information of the projector 50 in the A meeting room. As a result, the setting management information 540 in the memory part of the projector 50 stores the setting information corresponding to the A meeting room of the location information in addition to the setting information corresponding to the B meeting room and the C meeting room. The setting information of the projector 50 can be also utilized as the setting information when the projectors 10 and 40 are respectively used.

Third Embodiment

Figure 12:
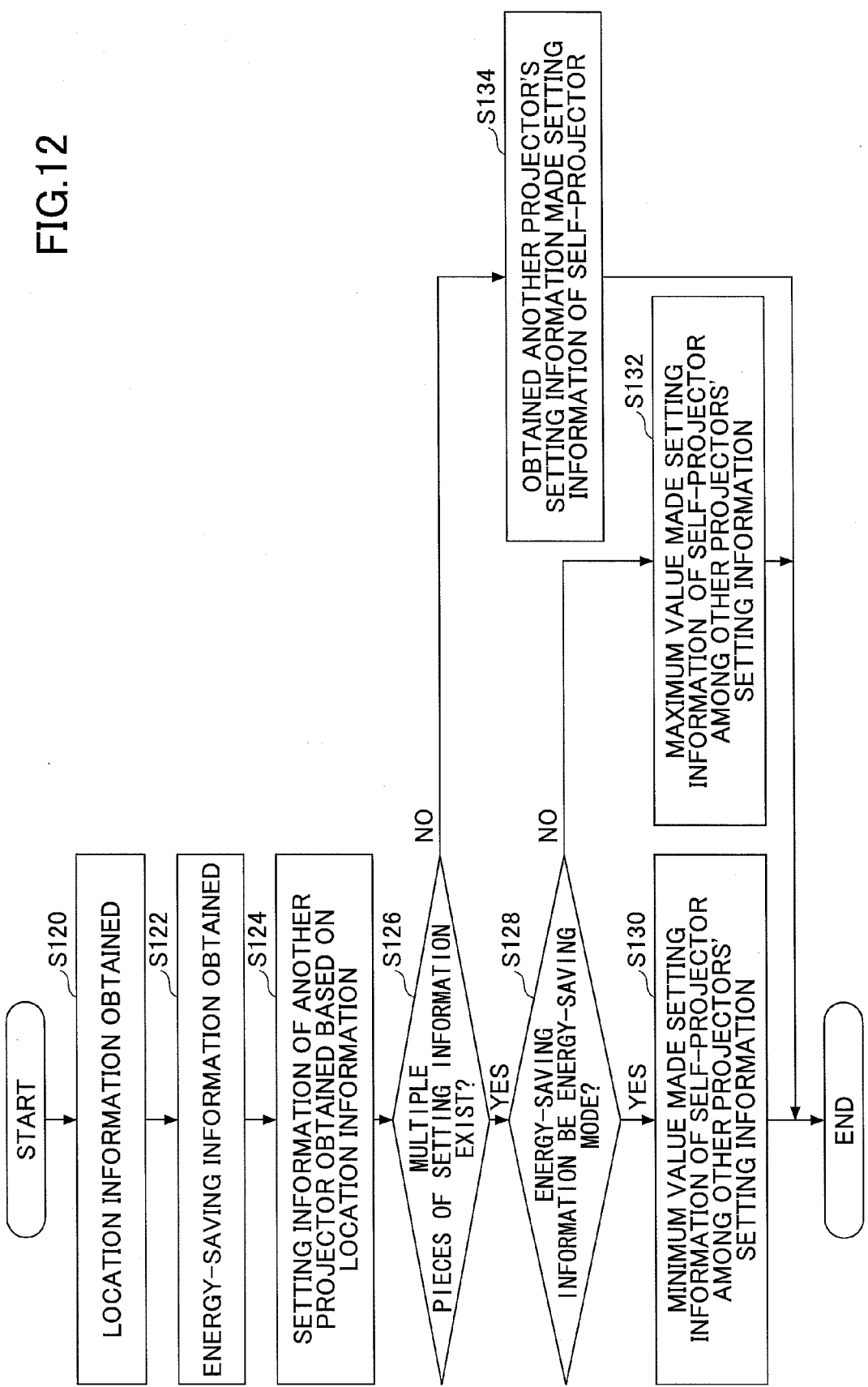
FIG. 12 is a flowchart showing a setting information determination process of the third embodiment.

Next, a description is given about a method of determining the setting information of a third embodiment, with reference to FIG. 12. The third embodiment is an example of storing energy-saving information in a memory part for each projector. The energy-saving information is information set in a projector by user operation, and is stored in the memory part when setting. The energy-saving information is set at either a normal mode or an energy-saving mode.

Figure 13:
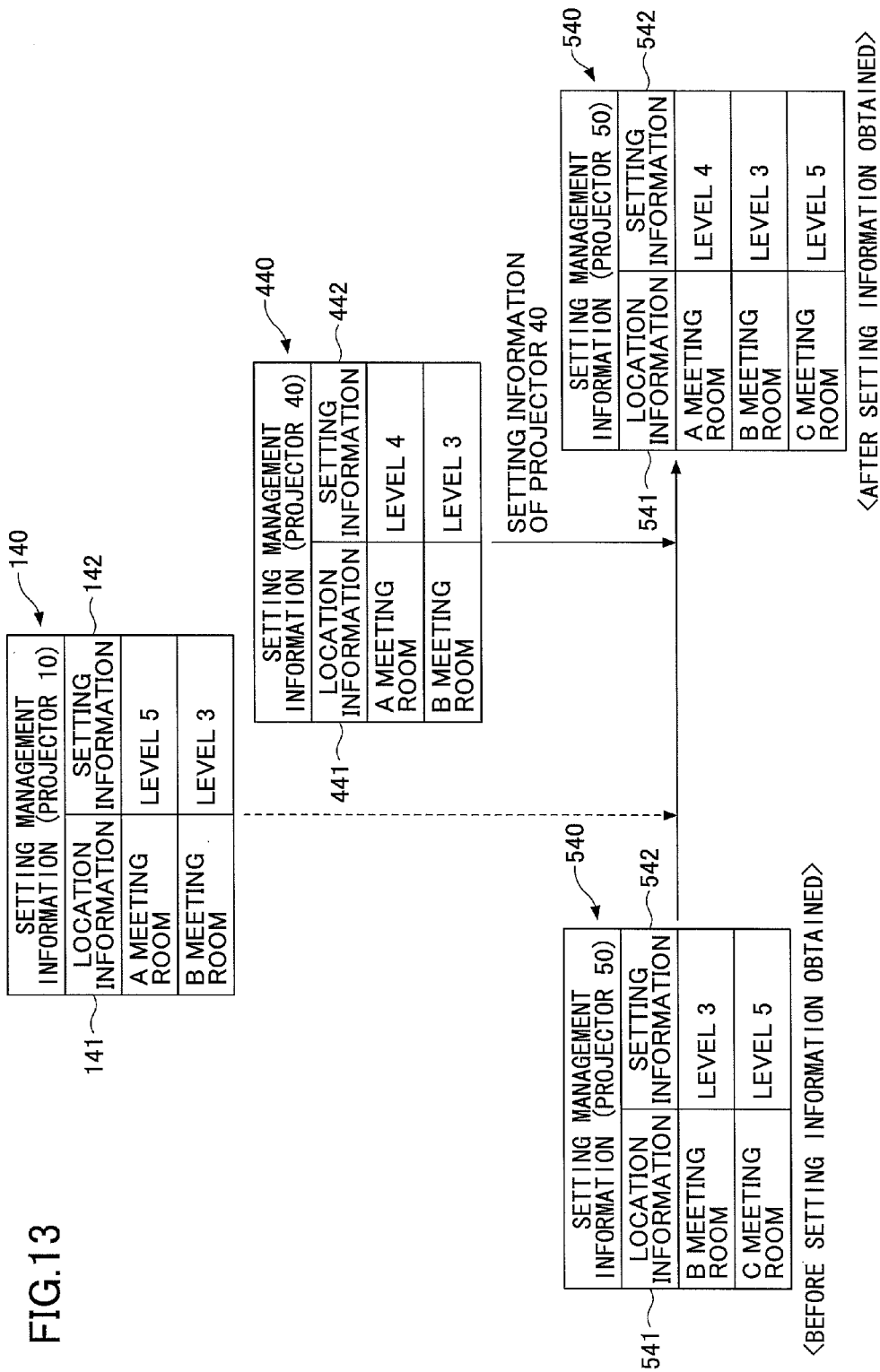
FIG. 13 is a diagram showing the setting information determination of the third embodiment.

Here, as shown in FIG. 13, an example is given in which the setting information of the projector 50 in the A meeting room is determined based on the setting management information 140 stored in the projector 10 and the setting management information 440 stored in the projector 40. The memory part of the projector 50 is assumed to preliminarily store the setting management information 540 shown in FIG. 13.

When a user enters the A meeting room, and turn on the projector 50, first, in step S120, the setting management part of the projector 50 obtains location information from the location obtaining part of the projector 50. Furthermore, in step S122, the setting management part of the projector 50 obtains energy-saving information. At this time, the setting management part of the projector 50 retrieves whether the obtained location information is stored in the setting management information 540 in the memory part of its own. When the obtained location information is stored in the self-memory part, the setting management part of the projector 50 determines that setting information corresponding to the stored location information is the setting information of the projector 50, and finishes the present process flow. Of course, advancing to step S124 without finishing the process is possible.

When the setting information corresponding to the obtained location information (e.g., A meeting room) is not stored in the memory part of the projector 50 (which includes a case of having advanced to step S124), the processes in the box 2. shown in FIG. 8 are executed. As a result, the projector 50 obtains the determined setting information from other projectors 10 and 40 based on the processes of determining the setting information that the other projectors 10 and 40 perform in the box 2.

Here, as shown in FIG. 13, the setting information 142 when the location information is the A meeting room is included in the setting management information 140. Accordingly, the setting management part 14 determines that the setting information is "level 5," and the communication part 13 transmits the setting information of "level 5" to the projector 40.

In addition, as shown in FIG. 13, the setting management information 440 contains setting information 442 when the location information is the A meeting room. Hence, the setting management part 44 determines that the setting information is "level 4," and the communication part 43 transmits the setting information of "level 4" to the projector 50.

In step S126, it is determined that the projector 50 has obtained a plurality of pieces of setting information. Here, because the projector 50 has obtained the plurality of pieces of setting information, the process proceeds to step S128, and the setting management part 44 determines whether the energy-saving information is the energy-saving mode.

The energy-saving information is set at the energy-saving mode, the process advances to step S130. In step S130, the setting management part 44 determines that a minimum value of "level 4" is the setting information of the self-projector 50, of the obtained plurality of pieces of setting information of the other projectors 10 and 40, and finishes the present process flow.

When the energy-saving is set at the normal mode, in step S132, the setting management part 44 determines that the obtained setting information of "level 5" is the setting information of its own, of the plurality of pieces of obtained setting information of the other projectors 10 and 40 as well as the second embodiment, and ends the present process flow.

As described above, according to the method of determining the setting information of the third embodiment, when the energy-saving information is the normal mode, the brightest value is adopted as the setting information of the plurality of pieces of setting information obtained from the plurality of projectors, by which the setting information determined by the projector 50 becomes similar to that of the second embodiment.

On the other hand, when the energy-saving information is the energy-saving mode, the darkest value is adopted as the setting information of the plurality of pieces of setting information obtained from the plurality of projectors. Because of this, when a user wishes to save energy, as shown in FIG. 13, the setting information determined by the projector 50 is set at the minimum vale of "level 4," and information is displayed at the set brightness, by which energy consumption is reduced. In this way, in the present embodiment, intention of a user can be reflected to the setting of the projector 50, and the energy saving can be ensured.

When the plurality of pieces of setting information do not exist, the setting information of the other projector obtained in step S134 is utilized as the setting information of the self-projector.

Fourth Embodiment

Figure 15:
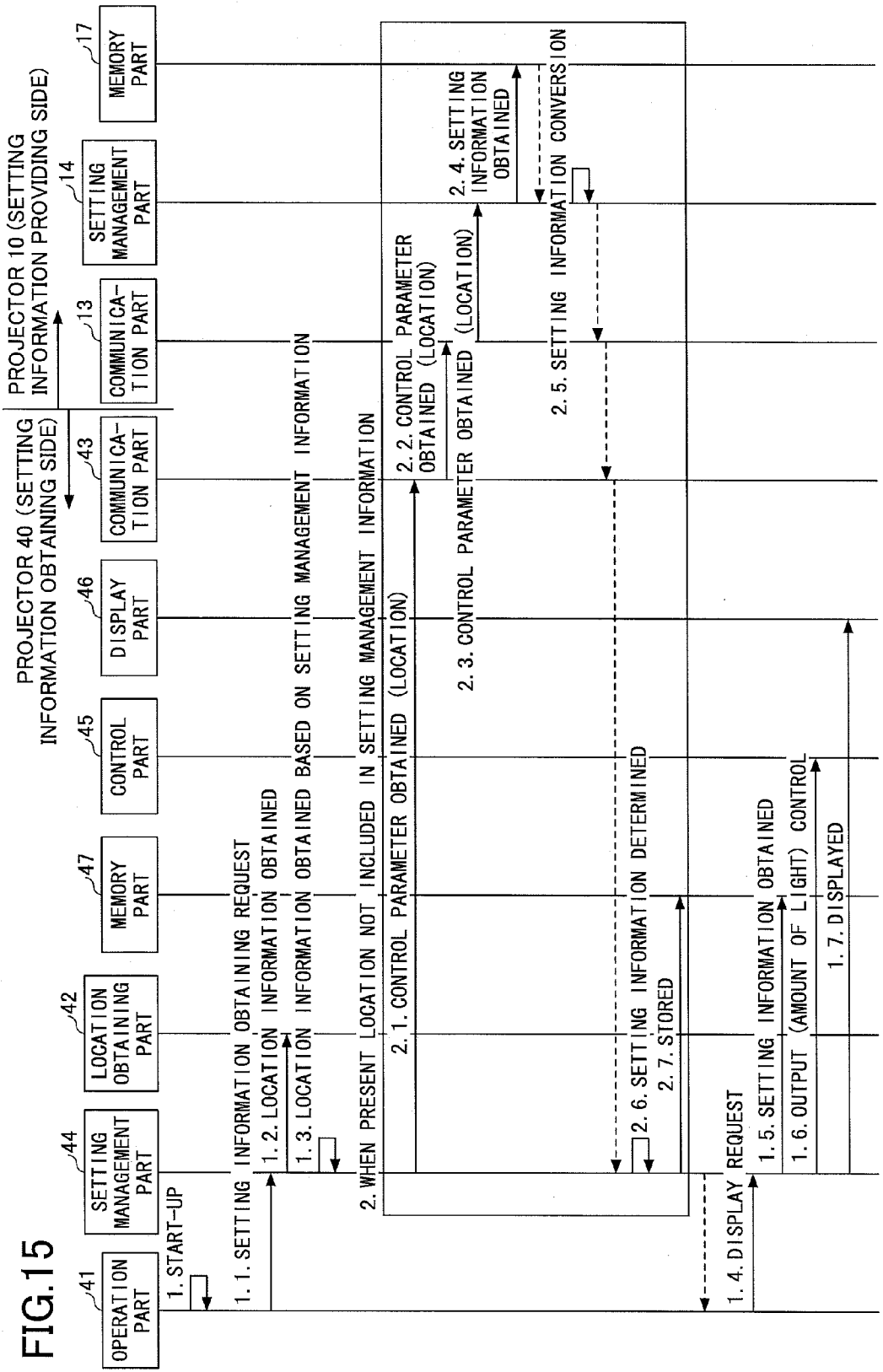
FIG. 15 is a sequence diagram of determining setting information of the fourth embodiment.

Next, a description is given about a method of determining the setting information of a fourth embodiment, with reference to a sequence of determining the setting information in FIG. 15. The fourth embodiment is an example showing a case of storing control parameter conversion information in a memory part for each projector. FIG. 14 shows an example of the control parameter conversion information. The control parameter conversion information 170 is configured to include setting information 171 that a user sets, and a control parameter 172 to actually control a projector. In the fourth embodiment, a property of each model is considered by using the control parameter conversion information 170 in determining the setting information. By doing this, in the present embodiment, even when setting information of a different model is utilized, the setting information proper for a model of the self-projector can be obtained by utilizing the setting information retained by another projector. The control parameter conversion information 170 is preliminarily stored within the projector, and cannot be changed.

A process of determining the setting information in FIG. 15 is executed in the following procedure when the projector is turned on. Here, the self-projector is made the projector 40 (i.e., setting information obtaining side), and another projector is made the projector 10 (i.e., setting providing side), under which operation of the projector 40 is described.

1. The projector 40 is powered on by user operation, and the projector 40 starts up.

1.1. The operation part 41 requests the setting management part 44 to obtain setting information according to the power-on.

1.2. The setting management part 44 obtains location information of the projector 40 from the location obtaining part 42.

1.3. The setting management part 44 retrieves whether the obtained location information is stored in the memory part 47, and obtains setting information corresponding to the location information when stored. In this case, a process of 1.4. is carried out without performing processes from 2.1. to 2.6 described below. Of course, the process of 1.4 may be executed after performing the processes from 2.1. to 2.6. described below.

2. When the setting information corresponding to the obtained location information is not stored in the memory part 47, setting information corresponding to the present location of the projector 40 is obtained from the other projector 10.

2.1. First, the setting management part 44 requests the other projector 10 to obtain the setting information corresponding to the present location information depending on a control parameter.

2.2. The communication part 43 transmits the request to the communication part 13 of the other projector 10, and the communication part 13 receives the request.

2.3. The communication part 13 conveys the request to the setting management part 14 of the other projector 10.

2.4. The setting management part 14 obtains the setting information corresponding to the present location information of the projector 40 sent from the memory part 17.

2.5. The setting management part 14 converts the setting information obtained based on control parameter conversion information 170 into a control parameter. The communication part 13 transmits the converted control parameter to the projector 40 through the communication part 43. For example, in FIG. 17, when the setting information is "level 5," the setting information is converted to "750 lux" of a control parameter 172 corresponding to the setting information 171 of the control parameter conversion information 170.

2.6. The setting management part 44 of the projector 40 determines the setting information corresponding to the control parameter sent from the projector 10 based on control parameter conversion information 470. For example, in FIG. 17, the setting management part 44 determines "level 3" of setting information 471 corresponding to "750 lux" of a control parameter 472.

2.7. The setting management part 44 stores the determined setting information in the memory part 47, associating with the location information.

1.4. When the setting information is determined by the setting management part 44, the operation part 41 requests the setting management part 44 to display information.

1.5. The setting management part 44 obtains the setting information corresponding to the present location of the projector 40 from the memory part 47.

1.6. The control part 45 controls the output (amount of light) of information displayed on the display part 46 by using the setting information.

1.7. The display part 46 displays the information in accordance with control by the control part 45.

In the present embodiment, even in the projectors 10 and 40 having different performances, the setting information of the projector 40 in the A meeting room can be determined based on the setting information of the projector 10.

Figure 16:
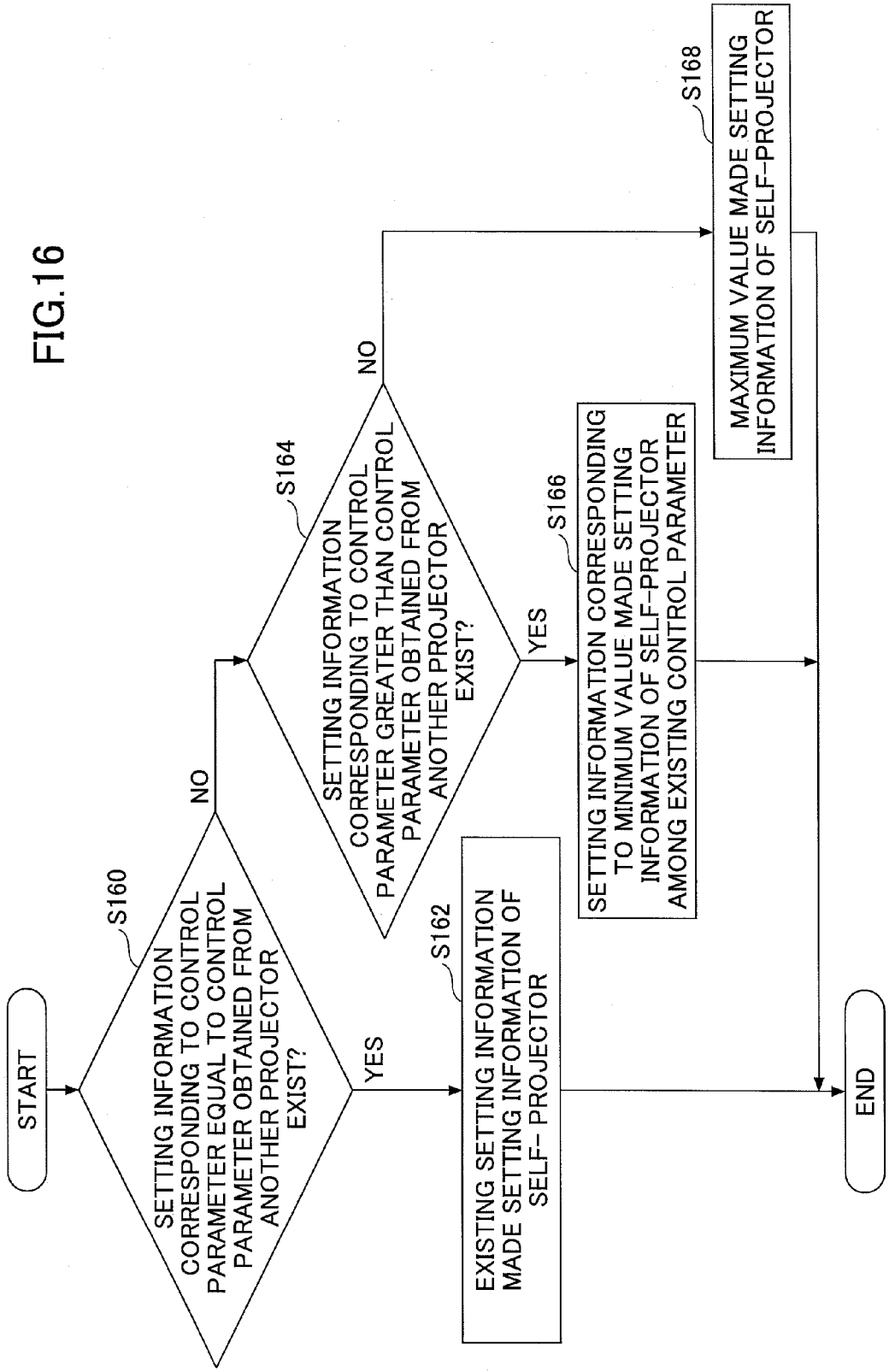
FIG. 16 is a flowchart showing a setting information determination process of the fourth embodiment.

Next, a description is given below about operation of determining the setting information corresponding to the control parameter sent from the projector 10 based on the control parameter conversion information 470 shown in 2.6. of FIG. 15, based on a flowchart for a process of determining the setting information shown in FIG. 16.

Figure 17:
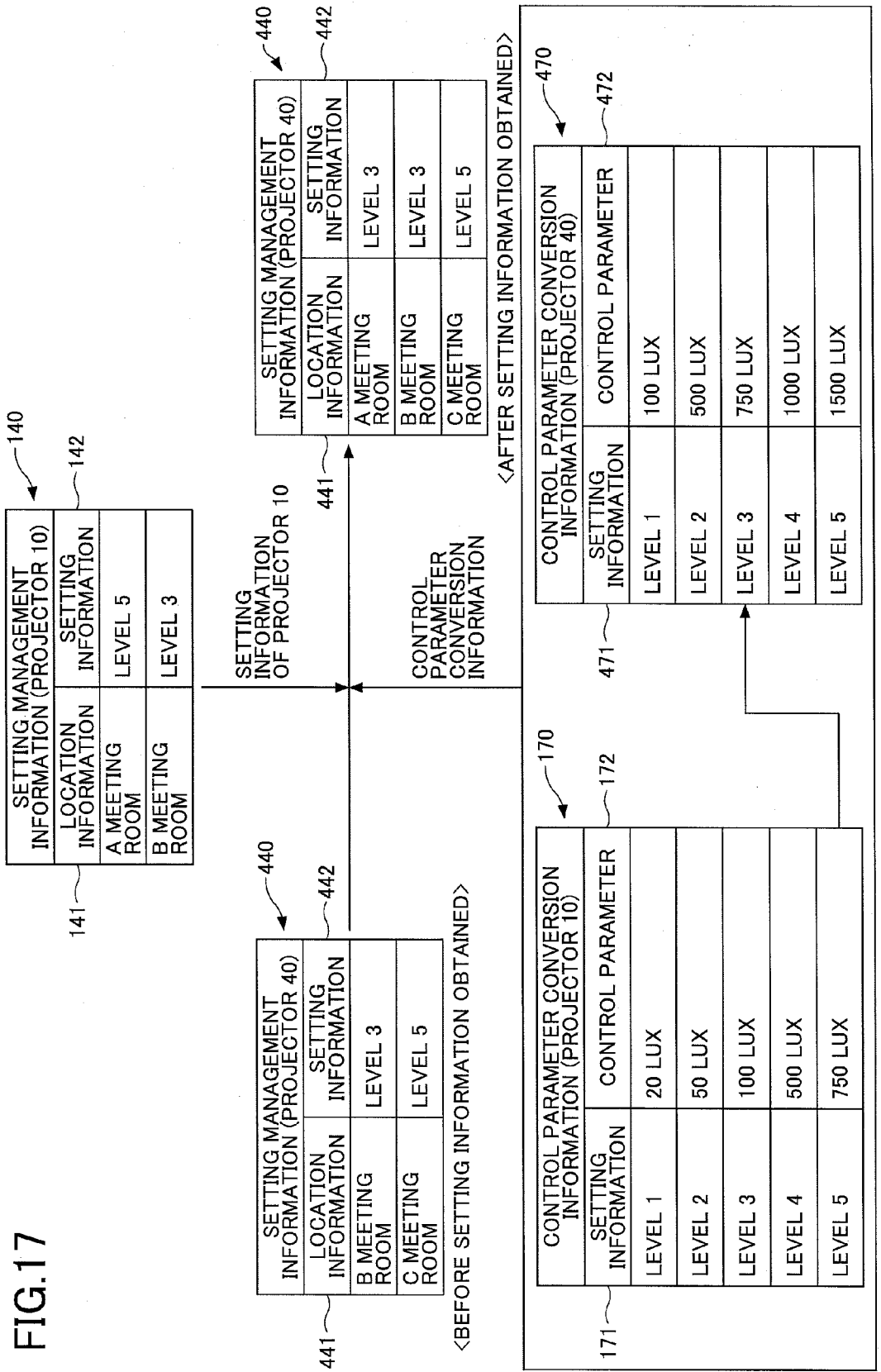
FIG. 17 is a diagram to illustrate the setting information determination of the fourth embodiment.

In the present embodiment, the memory part 17 of the projector 10 assumes to preliminarily store the setting management information 140, and the memory part 47 of the projector 40 assumes to preliminarily store the setting management information 440 and the control parameter 470. The setting management information 440 on the left side of FIG. 17 shows a state before obtaining the setting information, and the setting management information 440 on the right side of FIG. 17 shows a state after obtaining the setting information.

The setting management part 44 of the projector 40 determines the setting information corresponding to the control parameter sent from the projector 10 based on the control parameter conversion information 470 (2.6. in FIG. 15). First, in step S160 in FIG. 16, the setting management part 44 determines whether there is setting information corresponding to control parameter equal to the control parameter obtained from the other projector 10 in the control parameter conversion information 470 stored in the self-memory part 47.

When the setting information exists, in step S162, the setting management part 44 determines that the setting information is the setting information of the self-projector 40. FIG. 17 shows a case of converting "level 5" of setting information 171 of the control parameter conversion information 170 into "750 lux" of the control parameter 172, based on "level 5" of the setting information 142 obtained from the setting management information 140, and of transmitting the converted "750 lux" to the projector 40. In this case, the setting management part 44 determines that "level 3" of setting information 471 corresponding to "750 lux" of a control parameter 472 is the setting information of the self-projector 40 based on the control parameter conversion information 470.

In contrast, returning to FIG. 16 again, in step S160, when it is determined that the setting information corresponding to the control parameter equal to the control parameter obtained from the other projector 10 does not exist, the process proceeds to step S164. In step S164, the setting management part 44 determines whether the control parameter conversion information 470 contains setting information corresponding to a control parameter greater than the control parameter obtained from the other projector 10.

When the setting information exists, in step S166, the setting management control part 44 determines that setting information corresponding to the control parameter of the minimum value among the control parameters greater than the obtained control parameter is the setting information of the self-projector 40.

Figure 18:
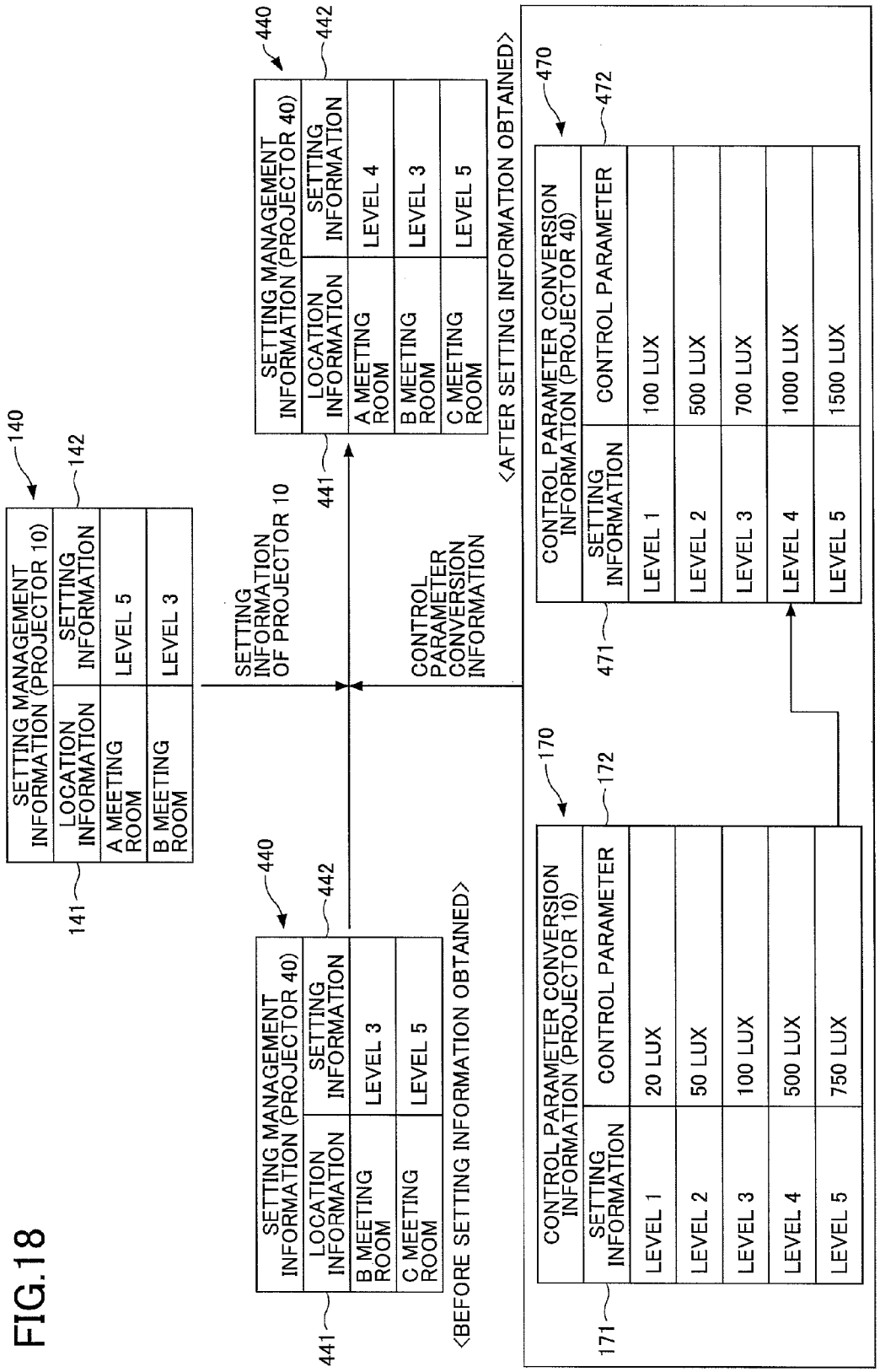
FIG. 18 is a diagram to illustrate the setting information determination of the fourth embodiment.

For example, FIG. 18 shows an example of a series of processes of steps S160, S164 and S166. Setting management information 440 on the left side of FIG. 18 shows a state before obtaining the setting information, and setting management information 440 on the right side of FIG. 18 shows a state after obtaining the setting information.

In FIG. 18, the setting information 142 in the location information 141 of "A meeting room" of the projector 10 is "level 5." According to the control parameter conversion information 170 in FIG. 18, the control parameter 172 corresponding to "level 5" of the setting information 171 is "750 lux." Hence, the projector 40 obtains the control parameter of "750 lux."

Furthermore, the setting management part 44 converts "750 lux" of a control parameter 472 to the setting information based on the control parameter conversion information 470. At this time, the control parameter conversion information 470 does not contain the control parameter 472 of "750 lux." Accordingly, the setting management part 44 selects the minimum value of "1000 lux" among the control parameters 472 of "1000 lux" and "1500 lux" that are greater than the obtained control parameters of "750 lux," and determines that setting information of "level 4" corresponding to the control parameter is the setting information of the self-projector 40. By doing this, the setting management information 440 stored in the memory part 47 of the projector 40 is updated as shown on the right side of FIG. 18.

Returning to FIG. 16 again, a description is given about a case of the control parameter conversion information 470 that does not contain the setting information corresponding to the control parameter greater than the control parameter obtained from the other projector 10 in step S164. In this case, in step S168, the setting management part 44 determines that the maximum value of the self-projector 40 is the setting information of the self-projector 40.

Figure 19:
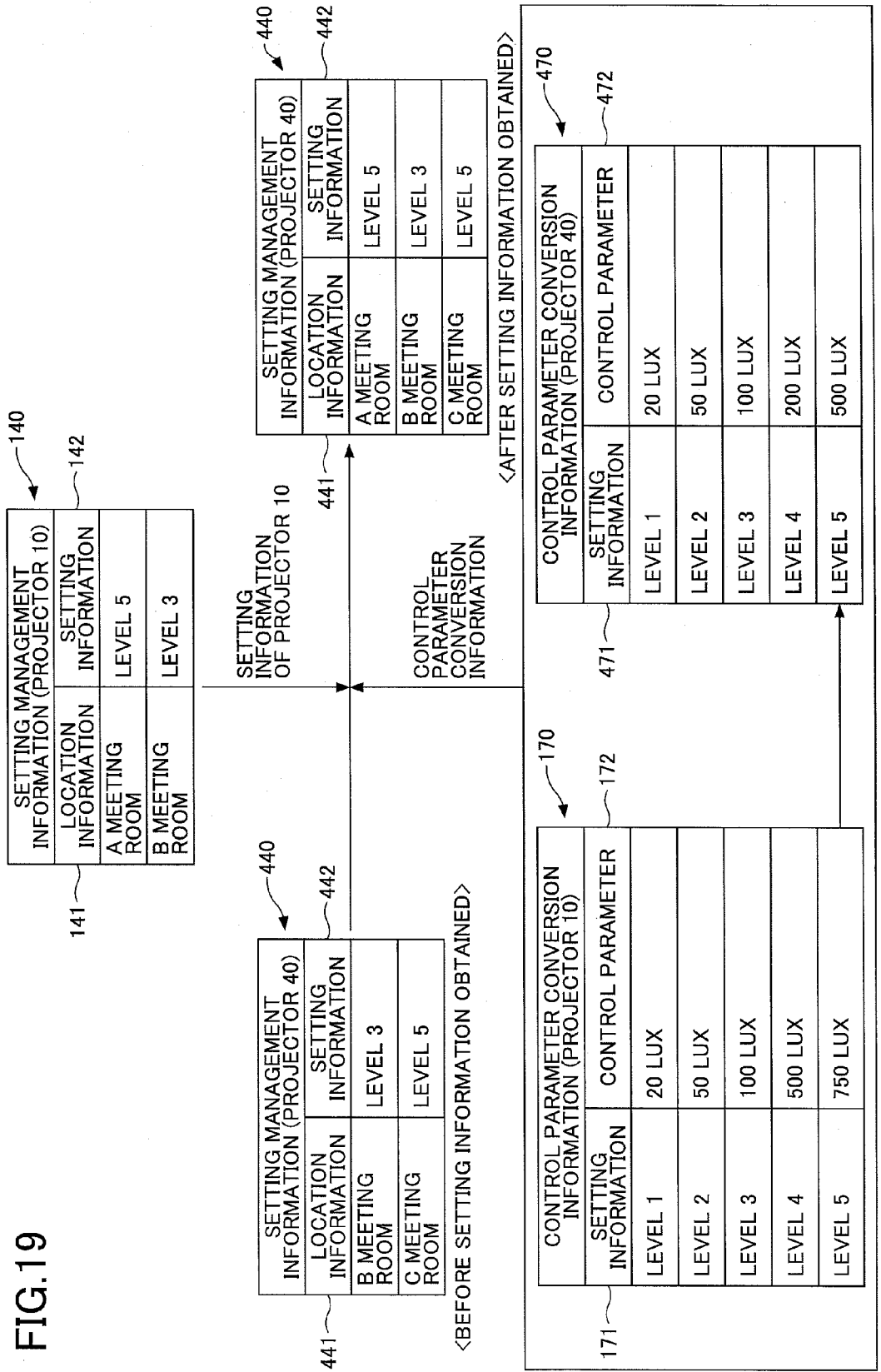
FIG. 19 is a diagram to illustrate the setting information determination of the fourth embodiment.

For example, FIG. 19 shows an example of a series of processes of steps S160, S164 and S168. Setting management information 440 on the left side of FIG. 19 shows a state before obtaining the setting information, and setting management information 440 on the right side of FIG. 19 shows a state after obtaining the setting information.

In FIG. 19, control parameter conversion information 470 does not contain a control parameter greater than "750 lux" of the control parameter corresponding to "level 5" of the setting information of the projector 10 in the A meeting room. In this case, the setting management control part 44 determines that the maximum value of "level 5" contained in the control parameter conversion information 470 is the setting information. This updates the setting management information 440 stored in the memory part 47 of the projector 40 as shown in the right side of FIG. 19.

As described above, according to the method of determining the setting information of the fourth embodiment, the setting information is determined, considering a property of each model by using the control parameter. Due to this, even when the information display devices having the same performances do not exist, the setting information suitable for a model of the self-projector can be acquired by utilizing the setting information retained in another projector of a different model.

In addition, even when the self-projector does not contain setting information corresponding to the same control parameter as the control parameter of the other projector that has obtained the setting information, setting information appropriate for performance of each projector can be determined.

Furthermore, even when the self-projector having obtained setting information and a corresponding control parameter from other projector, has inferior performance to the other projector, and the obtained control parameter is higher than the maximum value of control parameters of its own, the setting information suitable for the inferior performance of the self-projector can be determined.

Fifth Embodiment

Figure 20:
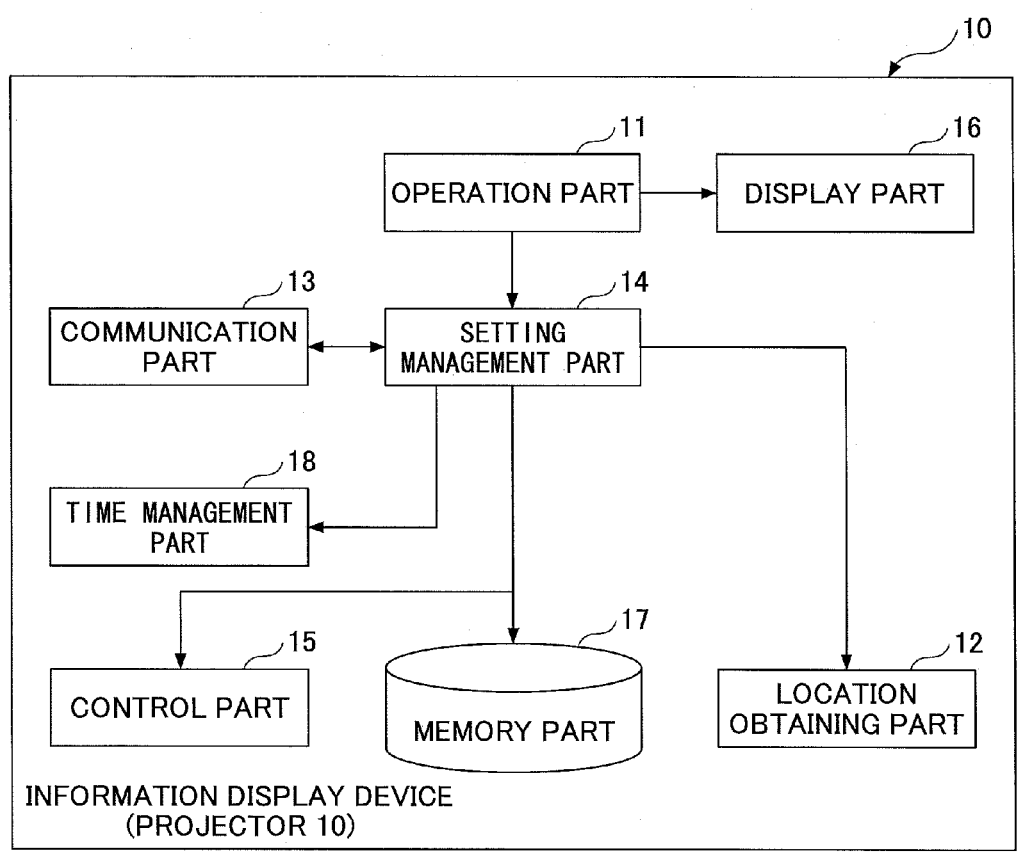
FIG. 20 is an inner configuration diagram of a projector of the fifth embodiment.

Next, a description is given about a method of determining the setting information of a fifth embodiment. A projector 10 of a fifth embodiment further has a function of a time management part 18 in addition to the function of the projector 10 shown in FIG. 2. In other words, as shown in FIG. 20, the projector 10 includes an operation part 11, a location obtaining part 12, a communication part 13, a setting management part 14, a control part 15, a display part 16, a memory part 17, and a time management part 18.

Here, a description is mainly given about a function of the time management part 18 added newly. The time management part 18 a timer function that obtains time information. The time management part 18 manages time information by associating the time information with time zone information, using the timer function. FIG. 21 shows an example of time zone definition information 180 stored in the memory part 17. The time zone definition information 180 stores time information 181 and time zone information 182 corresponding to each other. The time zone information 182 is information that defines time zones according to the time information 181 such as morning, afternoon and evening.

FIG. 22 shows setting management information 440 of the projector 40 as an example of the setting management information. In the present embodiment, time zone information 443 is added to the setting management information in addition to the location information 441 and the setting information 442. This makes it possible to change a level of the setting information 442 according to the time zone, for example, even if the location information is the A meeting room.

Figure 23:
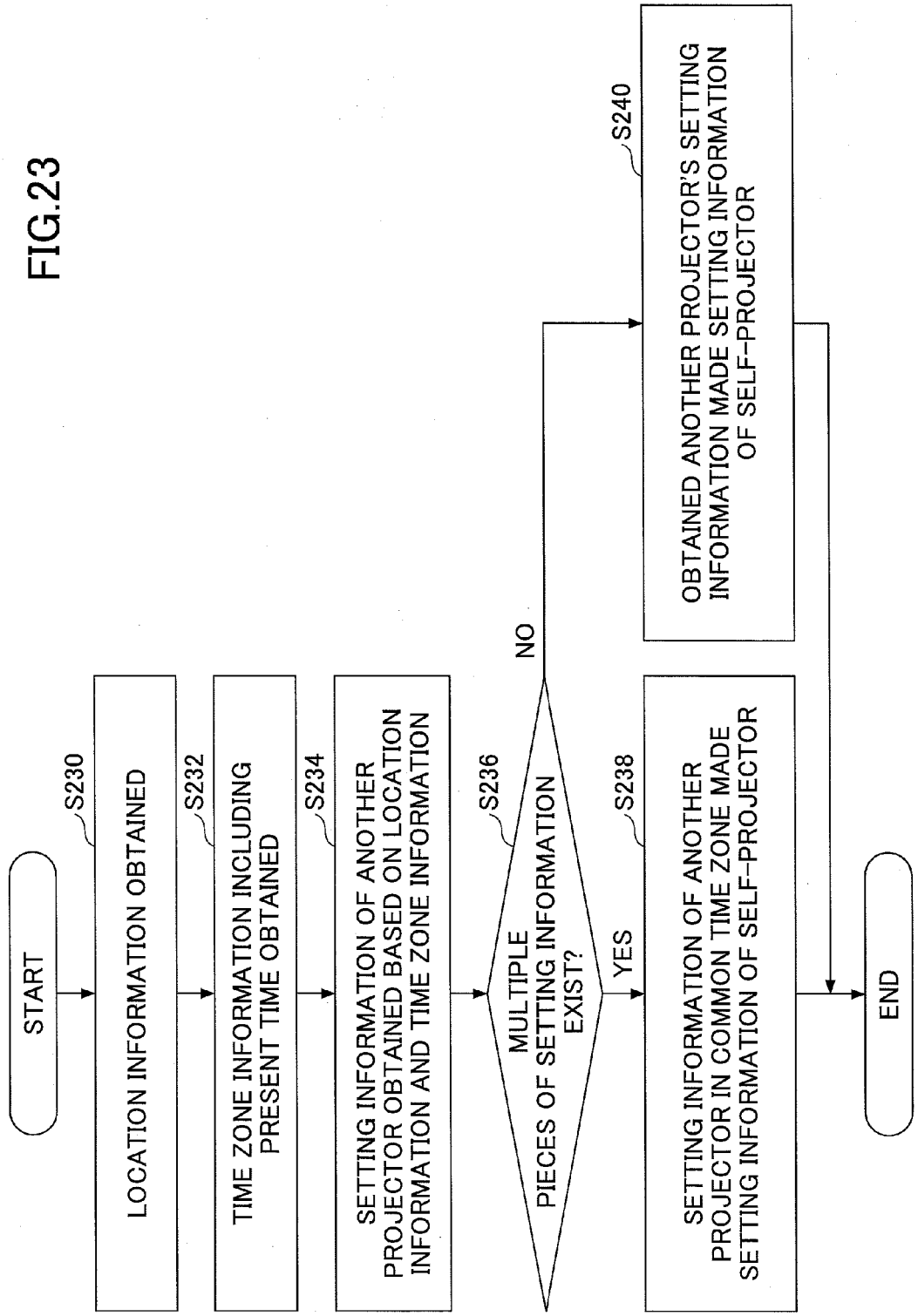
FIG. 23 is a flowchart showing a setting information determination process of the fifth embodiment.

A description is given about a method of determining the setting information of a fifth embodiment, concretely referring to a flowchart of FIG. 23.

When a user enters the A meeting room and powers on the projector 10, first, in step S230, the setting management part 14 obtains location information from the location obtaining part 12. Moreover, is step S232, the setting management part 14 obtains time zone information including the present time that is obtained by using the timer function. At this time, the setting management part 14 retrieves whether the setting information corresponding to the obtained location information and time zone information is stored in the setting management information 140 of the self-memory part 17. When the setting information corresponding to the obtained location information and time zone information is stored in the self-memory part 17, the setting management part 14 determines that the stored setting information is the setting information of the projector 10, and finishes the present process flow. Of course, proceeding to step S234 without finishing the process is possible.

On the other hand, when the setting information corresponding to the obtained location information and time zone information is not stored in the memory part 17 of the projector 10 (or when proceeding to step S234), in step S234, the setting management part 14 obtains the determined setting information from the other projector based on the location information and the time zone information.

Here, as shown in FIG. 22, when the location information is "A meeting room" in the setting management information 440 of the other projector 40, the setting information consistent with the time zone information obtained from the other projector 10 is selected of the three time zones of "morning," "afternoon," and "evening," and sent to the projector 10.

For example, when the location information sent to the other projector 40 from the projector 10 is "A meeting room," and the time zone information is "morning," it is determined that the setting information is "level 5."

Accordingly, the setting management part 44 determines that the setting information is "level 5," and the communication part 43 transmits the setting information of "level 5" to the projector 10. In this manner, the setting management part 14 obtains the setting information of "level 5" of the other projector 40 corresponding to the location information of the projector 10 and the time zone information when the projector 10 is used.

Next, in step S236, it is determined whether the setting information the projector 10 has obtained includes a plurality of pieces of setting information. Here, because the obtained setting information does not include the plurality of pieces of setting information, the process advances to step S240. In step S240, the setting management part 14 determines that the obtained other projector's setting information of "level 5" is the setting information of the self-projector 50, and finishes the present process flow.

In contrast, when the setting information that the projector 10 has obtained includes the plurality of pieces of setting information, the process proceeds to step S238. In step S238, the setting management part 14 determines that the maximum value of the setting information within the same time zone among the obtained plurality of pieces of setting information of the other projector is the setting information of the self-projector, and finishes the present process flow.

In the present embodiment, when storing the setting information in the memory part 17, the self-projector obtains the time information with the location information from the time management part 18 at that point. The time management part 18 obtains the time zone information 182 from the time zone definition information 180, based on the time information at that point, and stores the obtained time zone information in the memory part 17, associating the location information with the setting information.

As described above, according to the method of determining the setting information of the fifth embodiment, because the setting information is determined by adding the time zone information to the location information, the setting information indicating an environment closer to the actual usage environment of the projector can be determined based on the setting information of the other projector.

In the above embodiment, when the self-projector requests the setting information to the other projector, the self-projector transmits the time information with the location information at that point. However, it is possible that the self-projector transmits only the location information, that the other projector by itself acquires the time information at that point by using the timer function of its own and calculates the time zone information from the acquired time information at that point, and that the setting information is determined based on the transmitted location information and the calculated time zone information.

Sixth Embodiment

Figure 24:
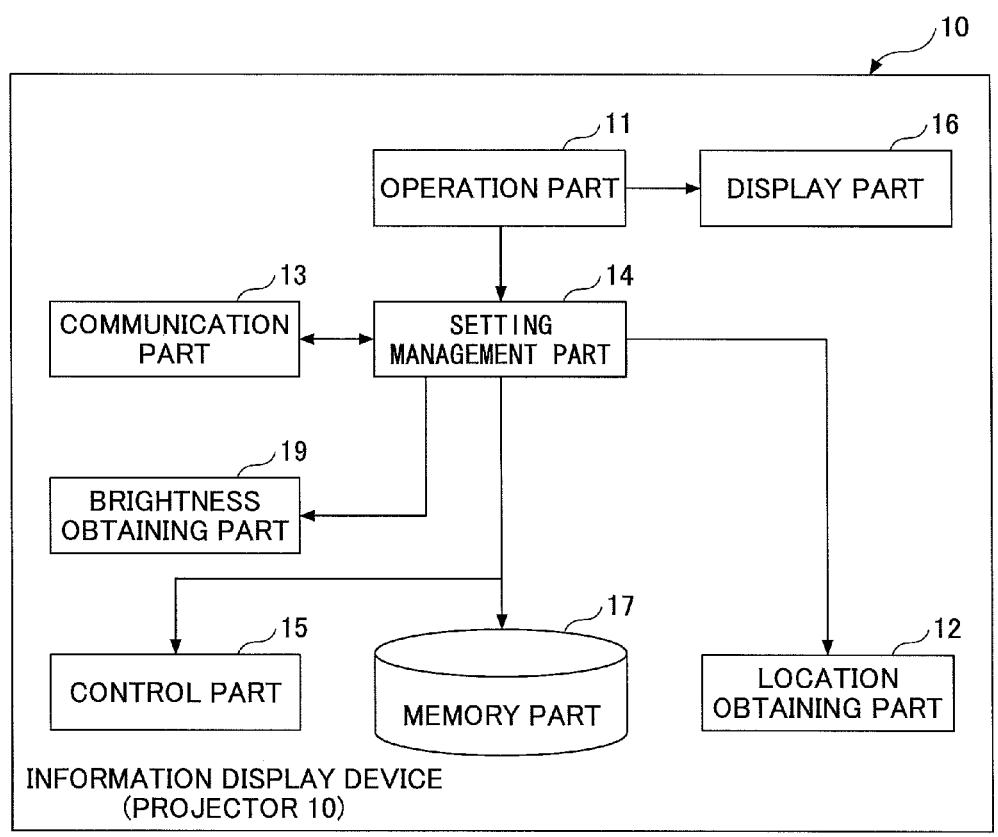
FIG. 24 is an inner configuration diagram of a projector of the sixth embodiment.

Next, a description is given about a method of determining the setting information of a sixth embodiment. A projector 10 of the sixth embodiment further includes a function of a brightness obtaining part 19, in addition to the function of the projector 10 shown in FIG. 2. In other words, as shown in FIG. 24, the projector 10 includes an operation part 11, a location obtaining part 12, a communication part 13, a setting management part 14, a control part 15, a display part 16, a memory part 17, and a brightness obtaining part 19.

Here, a description is mainly given about the brightness obtaining part 19 added newly. The brightness obtaining part 19 includes a sensor to detect brightness of the surrounding (not shown in the drawing), and calculates brightness information around the projector 10 from the sensor detection value. FIG. 25 shows setting management information 440 of the projector 40 as an example of the setting management information. The setting management information 440 contains added brightness information 444 in addition to location information 441 and setting information 442. As shown in FIG. 25, for example, even if the location information is the A meeting room, a level of the setting information 442 can be changed by the brightness information 444.

Figure 26:
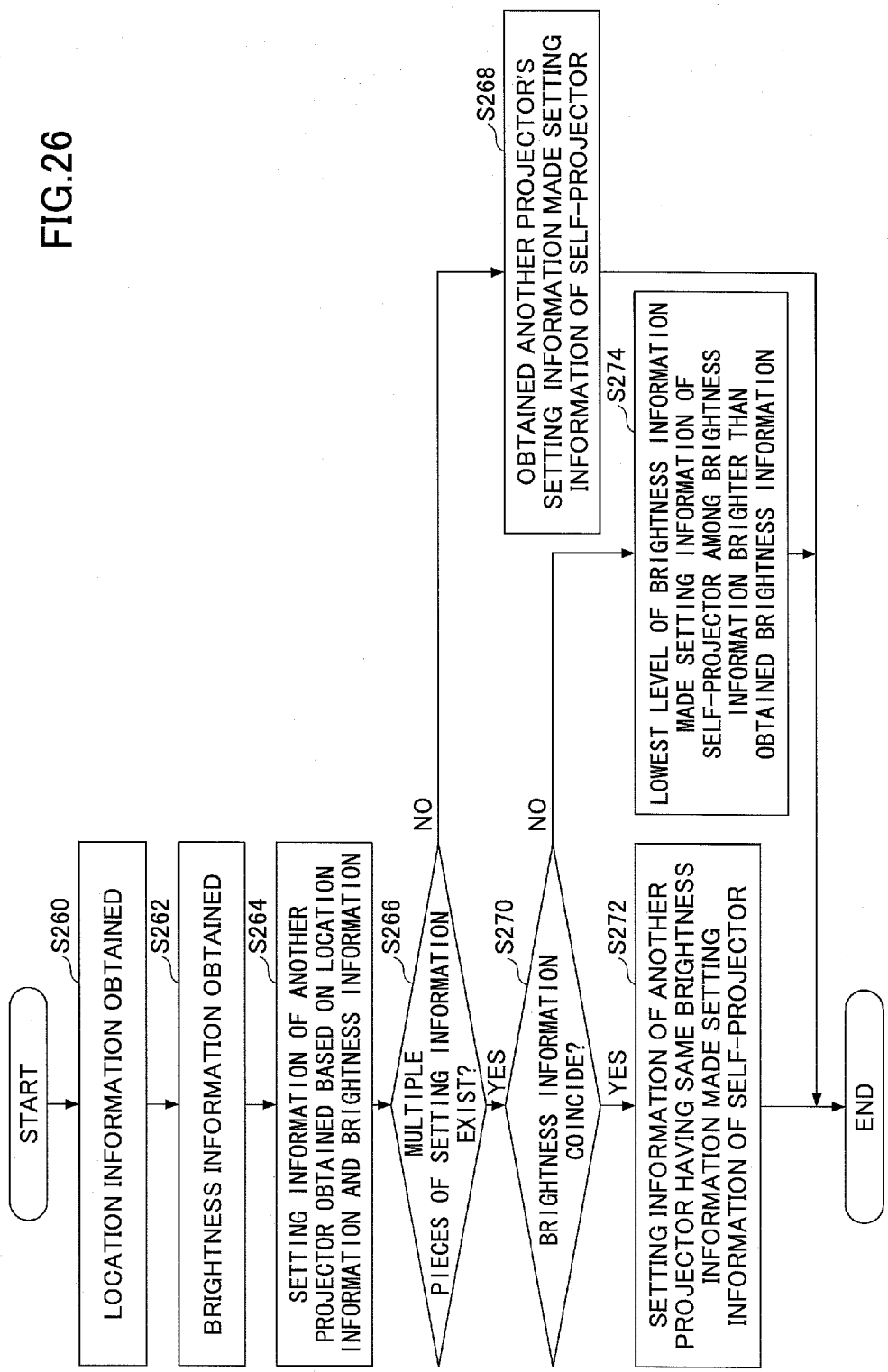
FIG. 26 is a flowchart showing a setting information determination process of the sixth embodiment.

A concrete description is given about a method of determining the setting information of the sixth embodiment, with reference to a flowchart of FIG. 26.

When a user enters the A meeting room and powers on the projector 10, first, in step S260, the setting management part 14 obtains location information from the location obtaining part 12. Moreover, in step S262, the setting management part 14 obtains brightness information at a location where the projector 10 is placed from a sensor value detected by the sensor. At this time, the setting management part 14 retrieves the setting information corresponding to the obtained location information and brightness information is stored in the setting management information 140 in the self-memory part 17. When the setting information corresponding to the obtained location information and brightness information is stored in the self-memory part 17, the setting management part 14 determines that the stored setting information is the setting information of the projector 10, and finishes the present process. Of course, the process can advance to step S264 without finishing the process.

On the other hand, when the setting information corresponding to the obtained location information and brightness information is not stored in the memory part 17 of the projector 10 (or when the process advances to step S264), in step S264, the setting management part 14 obtains the determined setting information from the other projector based on the location information and the brightness information.

When the self-projector requests the setting information to the other projector, the self-projector also transmits the brightness information with the location information to the other projector. The other projector that provides setting information determines that the setting information having the same location information and brightness information as the transmitted location information and brightness information is the setting information, and sends the setting information to the projector 10. When the other projector does not have the same brightness information as the sent brightness information, the other projector 10 determines that the setting information having the lowest level of brightness among the brightness information brighter than the transmitted brightness information is the setting information, and sends the determined setting information to the projector 10.

Here, as shown in FIG. 25, when the location information 441 is "A meeting room" in the setting management information 440 of the other projector 40, the setting information consistent with the brightness information obtained from the projector 10 is selected from among two pieces of brightness information 444 of "2000 lux" and "500 lux." When the location information obtained from the projector 10 is "A meeting room" and the brightness information is "500 lux," "level 3" of the setting information 442 is selected.

Accordingly, the setting management part 44 determines that the setting information is "level 3," and the communication part 43 transmits the setting information of "level 3" and the brightness information of "500 lux" to the projector 10. By doing this, the setting management part 14 of the projector 10 obtains the setting information of "level 3" of the other projector 40 in accordance with the location information of the projector 10 and the brightness environment where the projector 10 is used.

Furthermore, for example, when the location information obtained from the projector 10 is "A meeting room" and the brightness information is "700 lux," the setting management information 440 does not contain the same brightness information 444 as "700 lux." In this case, the other projector 40 defines the lowest level of brightness as the setting information among the plurality of pieces of brightness information brighter than the obtained brightness information. In this case, the setting information is defined as "level 5" in FIG. 25.

Hence, in this case, the setting management part 44 determines that the setting information is "level 5," and the communication part 43 sends the setting information of "level 5" and the brightness information of "2000 lux" to the projector 10.

In this way, the setting management part 14 obtains the setting information more suitable for the location information of the projector 10 and the brightness environment where the projector 10 is used from the other projector 40.

Next, in step S266, the setting management part 14 determines whether the projector 10 has obtained a plurality of setting information. When the projector 10 has not obtained the plurality of setting information, the process proceeds to step S268. In step S268, the setting management part 14 determines that the obtained setting information of the other projector is the setting information of the self-projector, and finishes the present process.

When the projector 10 has obtained the plurality of pieces of setting information, the process proceeds to step S270, and the setting management part 14 determines whether the brightness information is coincided.

When the brightness information sent from the projector 10 to the other projector 40 is "500 lux" and the projector 10 has obtained the setting information 444 of "level 3" and the brightness information 442 of "500 lux" from the other projector 40, the setting management part 14 determines that the setting information having the same brightness information of the other projector exists, defines the setting information of "level 3" of the other projector 40 consistent with the brightness information of its own as the setting information of the self-projector in step S272, and finishes the present process.

In contrast, when the brightness information sent from the projector 10 to the projector 40 is "500 lux" and the projector 10 has obtained the setting information 442 of "level 5" and the brightness information 444 of "2000 lux," the setting management part 14 determines that the setting information having the same brightness information does not exist among the obtained plurality of pieces of setting information of the other projector 40, defines the lowest level of the setting information of "level 5" as the setting information of the self-projector among the brightness information greater than the obtained plurality of pieces of brightness information, and finishes the present process.

As discussed above, according to the method of determining the setting information of the sixth embodiment, because the setting information is determined by adding the brightness information to the location information, the setting information indicating the environment closer to the usage environment of the projector based on the setting information of the other projector.

As described above, according to the information display systems 1 of the respective embodiments, the setting information corresponding to the location of the self-projector can be set by utilizing the setting information of the other projector.

In the information display systems 1 of the respective embodiments, each of the projectors stores the setting information mapping to the location information in the memory area in a server or a projector body on the network 30 when turning off the power of the projector. Then, when a certain projector is powered on, the certain projector receives the setting information stored in another projector or a server through the network 30, and determines the most appropriate setting information at the disposed location of the certain projector by utilizing the received setting information.

This makes it possible to set a setting suitable for the place based on the setting information stored in the other projector. In particular, even in a location where the projector is used for the first time, the setting appropriate for the place of the projector can be performed by utilizing the setting information stored in the other projector. The utilized location information is a meeting room where the projector is used and the like, and the brightness in displaying information can be adjusted in accordance with the usage environment.

In this manner, according to one embodiment of the present invention, setting information corresponding to a location of a self-information display device can be set by using setting information of another information display device.

As discussed above, the embodiments have described an information display system and an information display method with reference to accompanying drawings, but the present invention is not limited to the specifically disclosed embodiments, and variations and modifications may be made without departing from the scope of the present invention.

The information display device includes a CPU (Central Processing Unit) that is not shown in the drawings. A program to implement respective functions executed by the CPU may be stored in a memory unit such as a ROM (Read Only Memory) or a HDD (Hard Disk Drive) that is not shown in the drawings included in a computer (not shown in the drawing) from the beginning. Otherwise, the program may be recorded in a non-volatile recording medium (i.e., memory) such as a CD-ROM (Compact Disc-ROM), a flexible disk, an SRAM (Static Random Access Memory), an EEPROM (Electronically Erasable Programmable ROM), a memory card and the like, and the CPU execute the program by installing the program recorded in the memory into the computer, or by allowing the CPU to read the program from the memory. Furthermore, the CPU is connected to a network, and can download the program from an external device including a record medium recording the program or an external device storing the program in a memory unit.

The present application is based on and claims the benefit of priority of Japanese Priority Patent Application No. 2012-120643, filed on May 28, 2012, the entire contents of which are incorporated herein by reference.

What is claimed is:

1. An information display device comprising:
a global positioning system device configured to obtain location information;
a communication part including a communication circuit and configured to communicate with at least one other information display device through a network;
a setting management part configured to determine setting information corresponding to the location information based on setting management information stored in a memory part of the at least one other information display device in response to an operation from a user, the setting management part being at least one processor;
a display configured to display information; and
a control part configured to control an output of the information displayed on the display by using the setting information, the controller being the at least one processor.

2. The information display device as claimed in claim 1, further comprising:
a self-memory part configured to store the determined setting information.

3. The information display device as claimed in claim 1,
wherein the at least one other information display device includes a plurality of other information devices,
wherein the communication part communicates with the plurality of other information display devices, and
wherein the setting management part determines a plurality of pieces of the setting information corresponding to the location information based on the setting management information stored in the plurality of other information display devices, and
wherein the control part controls the output of the information displayed on the display by using a maximum value among the determined plurality of pieces of the setting information.

4. The information display device as claimed in claim 3,
wherein the setting management part obtains energy-saving information stored in the memory part of the at least one other information display device, and
wherein the control part controls the output of the information displayed on the display by using a minimum value among the determined plurality of pieces of the setting information when the energy-saving information is set at an energy-saving mode, and
by using the maximum value of the determined plurality of pieces of the setting information when the energy-saving information is set at a normal mode.

5. The information display device as claimed in claim 1,
wherein the at least one other information display device includes a plurality of other information display devices,
wherein the communication part communicates with the plurality of other information display devices,
wherein the setting management part determines a plurality of pieces of the setting information corresponding to the location information based on the setting management information stored in the plurality of other information devices, and
wherein the control part controls the output of the information displayed on the display by using second setting information determined by a majority rule among the determined plurality of pieces of the setting information.

6. The information display device as claimed in claim 1,
wherein the setting management part obtains a first control parameter for controlling the at least one other information display device stored in the memory part of the at least one other information display device, and converts the determined setting information into self-setting information based on the first control parameter, and
wherein the control part controls the output of the information displayed on the display by using the converted self-setting information.

7. The information display device claimed in claim 6, wherein the setting management part compares the first control parameter to a second control parameter for controlling the information display device itself, and determines that second setting information corresponding to the second control parameter is the self-setting information when the second control parameter identical to the first control parameter is detected.

8. The information display device as claimed in claim 6, wherein the setting management part compares the first control parameter to at least one second control parameter for controlling the information display device itself, and determines second setting information corresponding to a minimum value of the at least one second control parameter is the self-setting information when the second control parameter identical to the first control parameter is not detected, and the at least one second control parameter having a greater value than the first control value exists.

9. The information display device as claimed in claim 6, wherein the setting management part compares the first control parameter to at least one second control parameter for controlling the information display device itself, and determines that second setting information corresponding to a maximum value of the at least one second control parameter is the self-setting information when the second control parameter identical to the first control parameter is not detected, and the at least one second control parameter having a greater value than the first control value does not exist.

10. The information display device as claimed in claim 1, wherein the setting management information includes time zone information, and
wherein the setting management part determines second setting information of a time zone including a present time by using the time zone information included in the setting management information in determining the setting information corresponding to the location information based on the setting management information.

11. The information display device as claimed in claim 1, wherein the setting management information includes brightness information, and
wherein the setting management part determines second setting information of a minimum value among at least one piece of brightness information equal to or more than present brightness including a present time by using the brightness information included in the setting management information in determining the setting information corresponding to the location information based on the setting management information.

12. The information display device as claimed in claim 1, wherein the control part controls the output of the information displayed the display by controlling an amount of light of the information displayed on the display.

13. An information display device comprising:
a global positioning system device configured to obtain location information;
a communication part including a communication circuit and configured to communicate with an external memory device through a network;
a setting management part configured to determine setting information corresponding to the location information based on setting management information of at least one other information display device stored in the external memory device in response to an operation from a user, the setting management part being at least one processor;
a display configured to display information; and
a control part configured to control an output of the information displayed on the display by using the setting information, the controller being the at least one processor.

14. The information display device as claimed in claim 13, wherein the communication part transmits the determined setting information to the external memory device.

15. An information display method comprising steps of:
obtaining location information of a first information display device obtained by a first global positioning system device provided in the first information display device in response to an operation of the first information display device by a user;
requesting at least one second information display device to provide setting information corresponding to the location information for the first display device through a network by a communication unit including a communication circuit;
determining by at least one processor the setting information corresponding to the location information based on setting management information stored in a memory of the at least one second information display device;
obtaining the setting information in the first display device from the at least one second display device; and
displaying information on a display of the first display device by causing the at least one processor to control an output of the information, using the setting information.

16. The information display method as claimed in claim 15, further comprising:
storing the determined setting information in a self-memory part in the first information display device.

17. The information display method as claimed in claim 15, wherein the at least one second information display device includes a plurality of second information display devices,
wherein a plurality of pieces of the setting information are determined by the plurality of second information display devices, and
wherein the output of the information is controlled by using a maximum value of the plurality of pieces of the setting information.

18. The information display method as claimed in claim 17, wherein the first information display device obtains energy-saving information stored in the memory part of the at least one second information display device, and
wherein the output of the information is controlled by using a minimum value of the plurality of pieces of the setting information when the energy saving information is set at an energy-saving mode, and
is controlled by using the maximum value of the plurality of pieces of the setting information when the energy-saving information is set at an normal mode.

19. The information display method as claimed in claim 15, wherein the at least one second information display device includes a plurality of second information display devices,
wherein a plurality of pieces of the setting information are determined by the plurality of second information display devices, and
wherein the output of the information is controlled by using second setting information determined by a majority rule among the plurality of pieces of the setting information.

20. The information display method as claimed in claim 15, wherein the first information display device obtains a first control parameter for controlling the at least one second information display device stored in the memory part of the at least one second information display device, converts the determined setting information into self-setting information based on the first control parameter, and controls the output of the information displayed on the display by using the converted self-setting information.

* * * * *